United States Patent
Park et al.

(10) Patent No.: US 12,131,676 B2
(45) Date of Patent: *Oct. 29, 2024

(54) ELECTRONIC DEVICE INCLUDING PREVIEW IMAGES FOR BACKGROUND SCREEN FOR FLEXIBLE DISPLAY AND CONTROL METHOD THEREOF

(71) Applicant: Samsung Electronics Co., Ltd., Suwon-si (KR)

(72) Inventors: Gyeongtae Park, Suwon-si (KR); Jooyoung Kang, Suwon-si (KR); Youngseong Kim, Suwon-si (KR); Yangsoo Choi, Suwon-si (KR); Sungmin Hong, Suwon-si (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,262

(22) Filed: Mar. 9, 2023

(65) Prior Publication Data

US 2023/0215312 A1 Jul. 6, 2023

Related U.S. Application Data

(63) Continuation of application No. 17/519,070, filed on Nov. 4, 2021, now Pat. No. 11,636,791, which is a (Continued)

(30) Foreign Application Priority Data

Nov. 6, 2020 (KR) .................. 10-2020-0148048
Jan. 20, 2021 (KR) .................. 10-2021-0008252

(51) Int. Cl.
*G09G 3/00* (2006.01)

(52) U.S. Cl.
CPC ....... *G09G 3/035* (2020.08); *G09G 2340/045* (2013.01); *G09G 2354/00* (2013.01)

(58) Field of Classification Search
CPC ... G06F 1/16; G06F 3/14; G06F 3/147; G06F 1/3265; G09F 9/30; G09G 2320/0606;
(Continued)

(56) References Cited

U.S. PATENT DOCUMENTS 9,041,648 B2 5/2015 Lee et al.
10,534,453 B2 1/2020 Kwon et al.
(Continued)

FOREIGN PATENT DOCUMENTS

CN 104317499 A 1/2015
CN 104750393 A 7/2015
(Continued)

OTHER PUBLICATIONS

International Search Report dated Jan. 14, 2022, issued in International Patent Application No. PCT/KR2021/013404.
(Continued)

*Primary Examiner* — Richard J Hong
(74) *Attorney, Agent, or Firm* — Jefferson IP Law, LLP

(57) ABSTRACT

An electronic device comprises a display having a display area, wherein a size of the display area visually exposed in a first state of the electronic device is reduced and a size of the display area visually exposed in a second state of the electronic device is enlarged, and a processor operatively connected to the display, wherein the processor may be configured to acquire state information of the electronic device, successively display a first preview image and a second preview images on the display, based on the state information of the electronic device, wherein the first preview image includes a first area of a specified image and corresponds to a preview image of a background screen in
(Continued)

the first state, wherein the second preview image comprises a second area including the first area and a further area extending from the first area, and corresponds to a preview image of a background screen in the second state, and specify the image as a background screen, based on a first user input.

18 Claims, 18 Drawing Sheets

Related U.S. Application Data continuation of application No. PCT/KR2021/013404, filed on Sep. 29, 2021.

(58) Field of Classification Search
CPC ..... G09G 2340/0421; G09G 2340/045; G09G 2354/00; G09G 2358/00; G09G 2370/022; G09G 2380/02; G09G 3/035; G09G 5/391; H04M 1/0268; G06T 3/08

See application file for complete search history.

(56) References Cited

U.S. PATENT DOCUMENTS

| | | |
|---|---|---|
| 10,963,016 B1 | 3/2021 | Oh et al. |
| 2010/0060548 A1* | 3/2010 | Choi ................... H04M 1/0268 345/1.3 |
| 2013/0127918 A1* | 5/2013 | Kang ................... G06F 1/3265 345/660 |
| 2013/0201208 A1 | 8/2013 | Cho et al. |
| 2013/0275910 A1 | 10/2013 | Kim et al. |
| 2013/0305189 A1* | 11/2013 | Kim ................... H04M 1/72427 715/838 |
| 2014/0247229 A1 | 9/2014 | Cho et al. |
| 2014/0340299 A1* | 11/2014 | Lee ........................ G06F 3/147 345/156 |
| 2015/0113475 A1 | 4/2015 | Xu et al. |
| 2016/0217551 A1* | 7/2016 | Kim ......................... G06T 3/08 |
| 2018/0217679 A1 | 8/2018 | Kwon et al. |
| 2018/0275770 A1 | 9/2018 | Kang et al. |
| 2018/0329514 A1 | 11/2018 | Kwon et al. |
| 2019/0278336 A1 | 9/2019 | Choi et al. |
| 2020/0050285 A1* | 2/2020 | Kwon ....................... G09F 9/30 |
| 2020/0401190 A1 | 12/2020 | Sim et al. |

FOREIGN PATENT DOCUMENTS

| | | |
|---|---|---|
| CN | 109284034 A | 1/2019 |
| EP | 2 665 243 A1 | 11/2013 |
| KR | 10-2011-0024163 A | 3/2011 |
| KR | 10-2014-0135404 A | 11/2014 |
| KR | 10-2015-0012295 A | 2/2015 |
| KR | 10-1676555 B1 | 11/2016 |
| KR | 10-2017-0011675 A | 2/2017 |
| KR | 10-2017-0062121 A | 6/2017 |
| KR | 10-1868352 B1 | 6/2018 |
| KR | 10-2019-0090982 A | 8/2019 |

OTHER PUBLICATIONS

Extended European Search Report dated Dec. 19, 2023, issued in European Patent Application No. 21889387.3.
Indian Office Action dated May 29, 2024, issued in Indian Patent Application No. 202337029259.

* cited by examiner

ELECTRONIC DEVICE INCLUDING PREVIEW IMAGES FOR BACKGROUND SCREEN FOR FLEXIBLE DISPLAY AND CONTROL METHOD THEREOF

CROSS-REFERENCE TO RELATED APPLICATION(S)

This application is a continuation application of prior application Ser. No. 17/519,070, filed on Nov. 4, 2021, which application is a continuation application, claiming priority under § 365(c), of an International application No. PCT/KR2021/013404, filed on Sep. 29, 2021, which is based on and claims the benefit of a Korean patent application number 10-2020-0148048, filed on Nov. 6, 2020, in the Korean Intellectual Property Office, and of a Korean patent application number 10-2021-0008252, filed on Jan. 20, 2021, in the Korean Intellectual Property Office, the disclosure of each of which is incorporated by reference herein in its entirety.

TECHNICAL FIELD

Embodiments disclosed in the disclosure may relate to an electronic device including a flexible display and a control method thereof.

BACKGROUND ART

An electronic device may display a screen through a display. The display included in the electronic device may be a flexible display. For example, the flexible display may be disposed on the electronic device and in a form in which at least one area thereof is curved, foldable, or rollable. Depending on a state of the electronic device, a size of a visually exposed display area of the display may decrease or increase.

The above information is presented as background information only to assist with an understanding of the disclosure. No determination has been made, and no assertion is made, as to whether any of the above might be applicable as prior art with regard to the disclosure.

DISCLOSURE

Technical Problem

Embodiments of the disclosure are to address at least the above-mentioned problems and/or disadvantages and to provide at least the advantages described below. Accordingly, embodiments of the disclosure are to provide an electronic device capable of displaying a background screen corresponding to an extended or retracted state of the display according to a change in a state of the electronic device.

Further, embodiments of the disclosure are to provide an intuitive and efficient background screen setting experience to a user in relation to a background screen that is displayed in a varying manner according to a state change of an electronic device in a background screen setting screen.

Additional embodiments will be set forth in part in the description which follows and, in part, will be apparent from the description, or may be learned by practice of the presented embodiments.

Technical Solution

According to an embodiment of the disclosure, an electronic device comprises: a display having a display area, wherein a size of the display area visually exposed in a first state of the electronic device is reduced and a size of the display area visually exposed in a second state of the electronic device is enlarged, and a processor operatively connected to the display, wherein the processor may be configured to acquire state information of the electronic device, successively display a first preview image and a second preview images on the display, based on the state information of the electronic device, wherein the first preview image includes a first area of a specified image and corresponds to a preview image of a background screen in the first state, wherein the second preview image includes a second area including the first area and a further area extending from the first area, and corresponds to a preview image of a background screen in the second state, and specify the image as a background screen, based on a first user input.

According to an embodiment of the disclosure, a method for controlling an electronic device including a flexible display having a display area according to one embodiment is proposed, wherein a size of the display area visually exposed in a first state of the electronic device is reduced, and a size of the display area visually exposed in a second state of the electronic device is enlarged. The method may comprise acquiring state information of the electronic device, successively displaying a first preview image and a second preview images on the display, based on the state information of the electronic device, wherein the first preview image includes a first area of a specified image and corresponds to a preview image of a background screen in the first state, wherein the second preview image includes a second area including the first area and a further area extending from the first area, and corresponds to a preview image of a background screen in the second state, and specifying the image as a background screen, based on a first user input.

Advantageous Effects

According to the embodiments, the electronic device may display the background screen corresponding to the extended or retracted state of the display according to the state change of the electronic device.

Further, according to embodiments, the electronic device may provide the intuitive and efficient background screen setting experience to the user in relation to the background screen that is displayed in a varying manner according to the state change of the electronic device in the background screen setting screen.

In addition, various effects directly or indirectly identified through the disclosure may be provided.

Other embodiments, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that same or similar reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
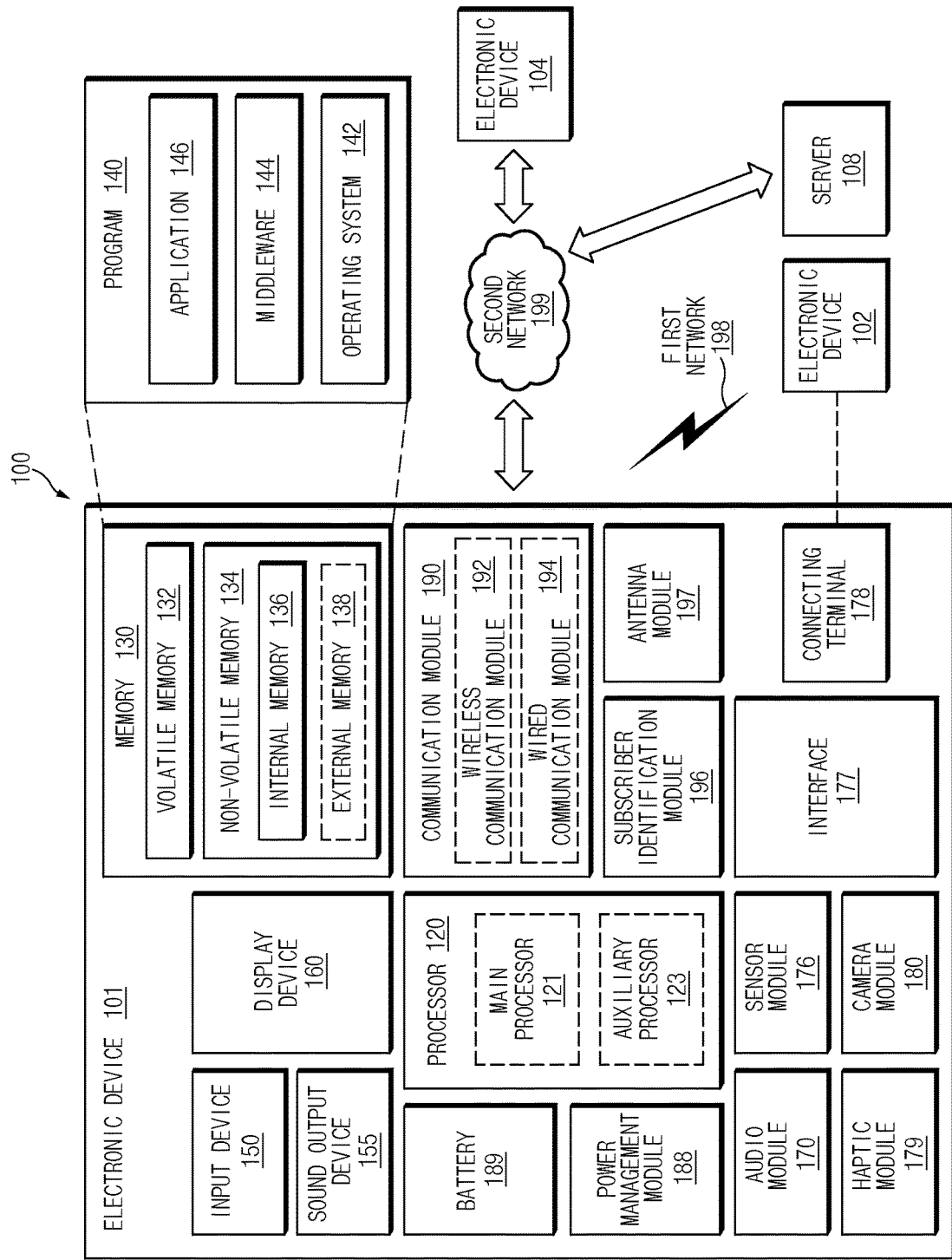
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
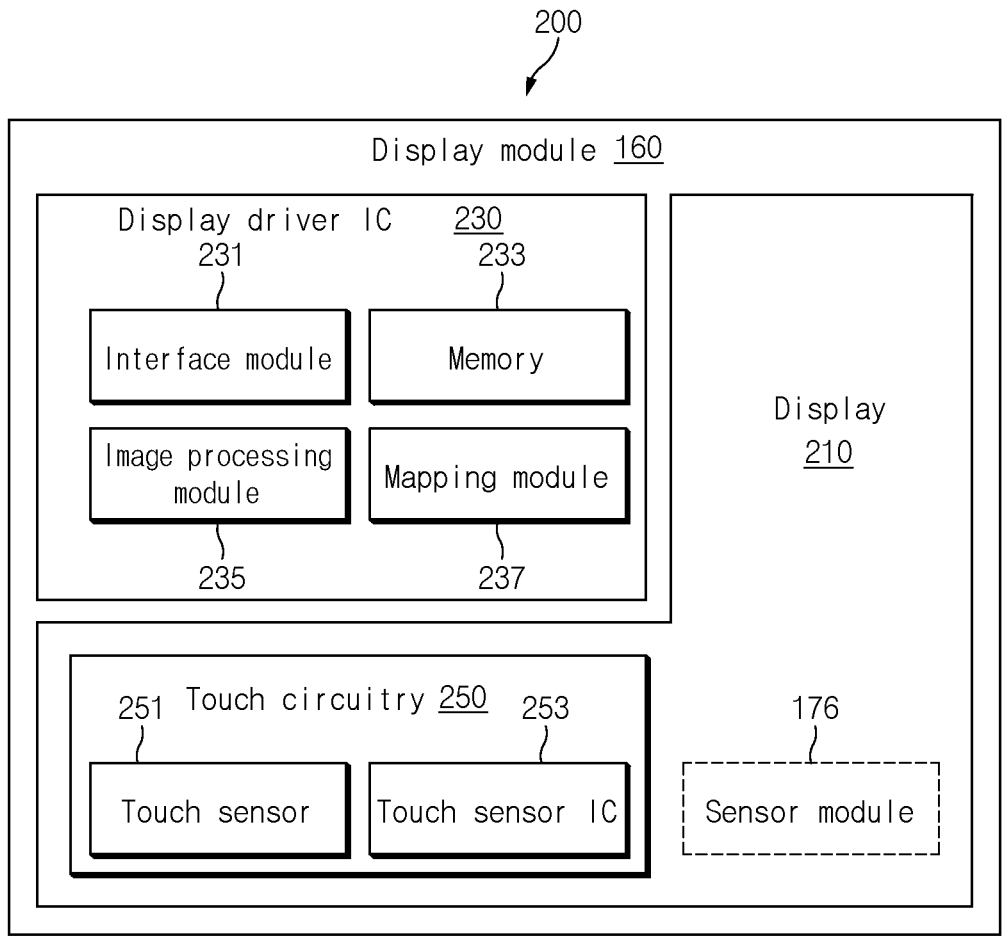
FIG. 2 is a block diagram of a display module according to an embodiment of the disclosure.

FIG. 2 is a block diagram illustrating a display module according to an embodiment of the disclosure.

Referring to FIG. 2, in a block diagram 200, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
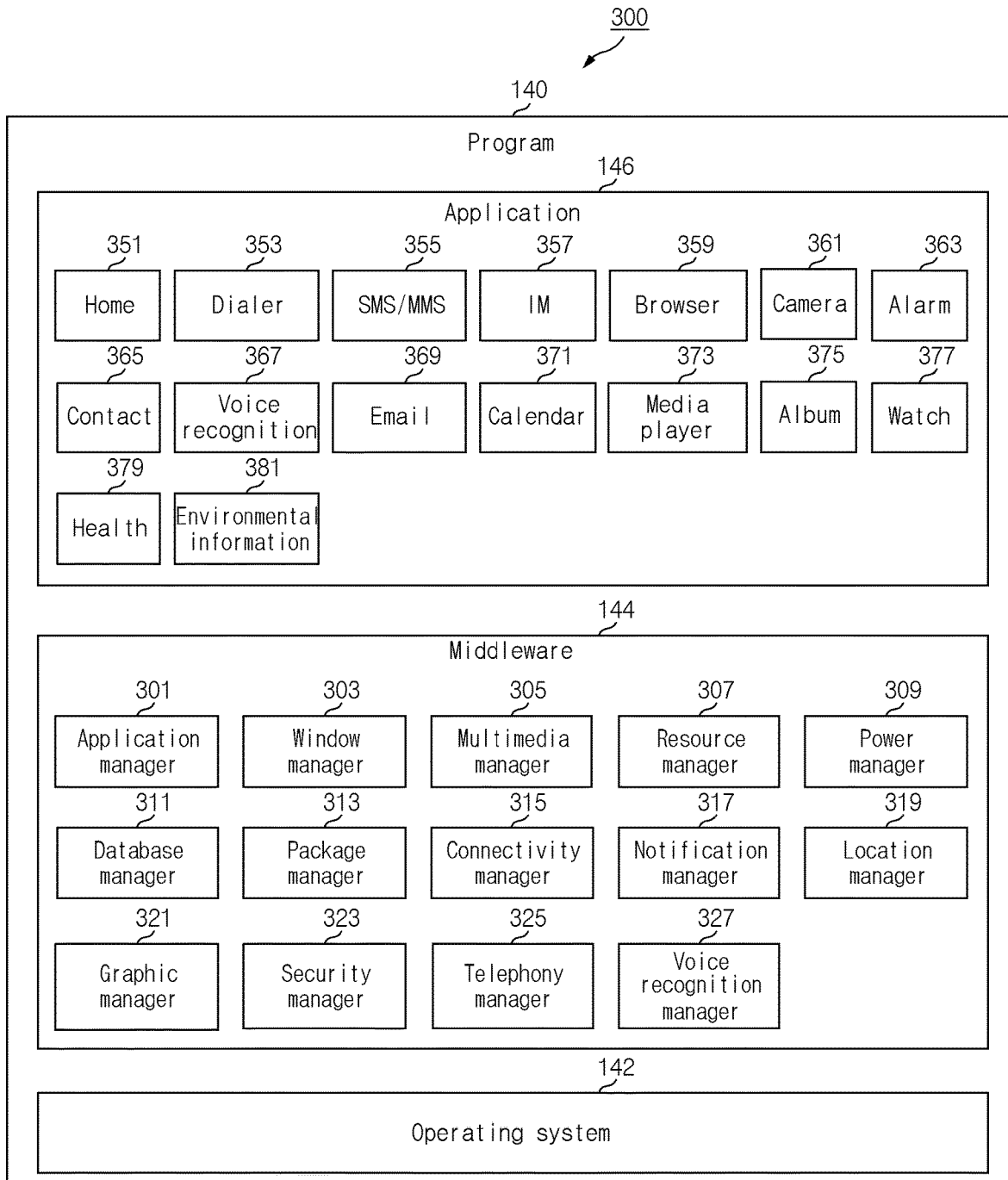
FIG. 3 is a block diagram illustrating a program according to an embodiment of the disclosure.

FIG. 3 is a block diagram illustrating the program according to an embodiment of the disclosure.

Referring to FIG. 3, according to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327.

The application manager 301, for example, may manage the life cycle of the application 146. The window manager 303, for example, may manage one or more graphical user interface (GUI) resources that are used on a screen. The multimedia manager 305, for example, may identify one or more formats to be used to play media files, and may encode or decode a corresponding one of the media files using a codec appropriate for a corresponding format selected from the one or more formats. The resource manager 307, for example, may manage the source code of the application 146 or a memory space of the memory 130. The power manager 309, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 309 may interwork with a basic input/output system (BIOS) (not shown) of the electronic device 101.

The database manager 311, for example, may generate, search, or change a database to be used by the application 146. The package manager 313, for example, may manage installation or update of an application that is distributed in the form of a package file. The connectivity manager 315, for example, may manage a wireless connection or a direct connection between the electronic device 101 and the external electronic device. The notification manager 317, for example, may provide a function to notify a user of an occurrence of a specified event (e.g., an incoming call, message, or alert). The location manager 319, for example, may manage locational information on the electronic device

101. The graphic manager 321, for example, may manage one or more graphic effects to be offered to a user or a user interface related to the one or more graphic effects.

The security manager 323, for example, may provide system security or user authentication. The telephony manager 325, for example, may manage a voice call function or a video call function provided by the electronic device 101. The voice recognition manager 327, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 351, dialer 353, short message service (SMS)/multimedia messaging service (MMS) 355, instant message (IM) 357, browser 359, camera 361, alarm 363, contact 365, voice recognition 367, email 369, calendar 371, media player 373, album 375, watch 377, health 379 (e.g., for measuring the degree of workout or biometric information, such as blood sugar), or environmental information 381 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 369) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 4:
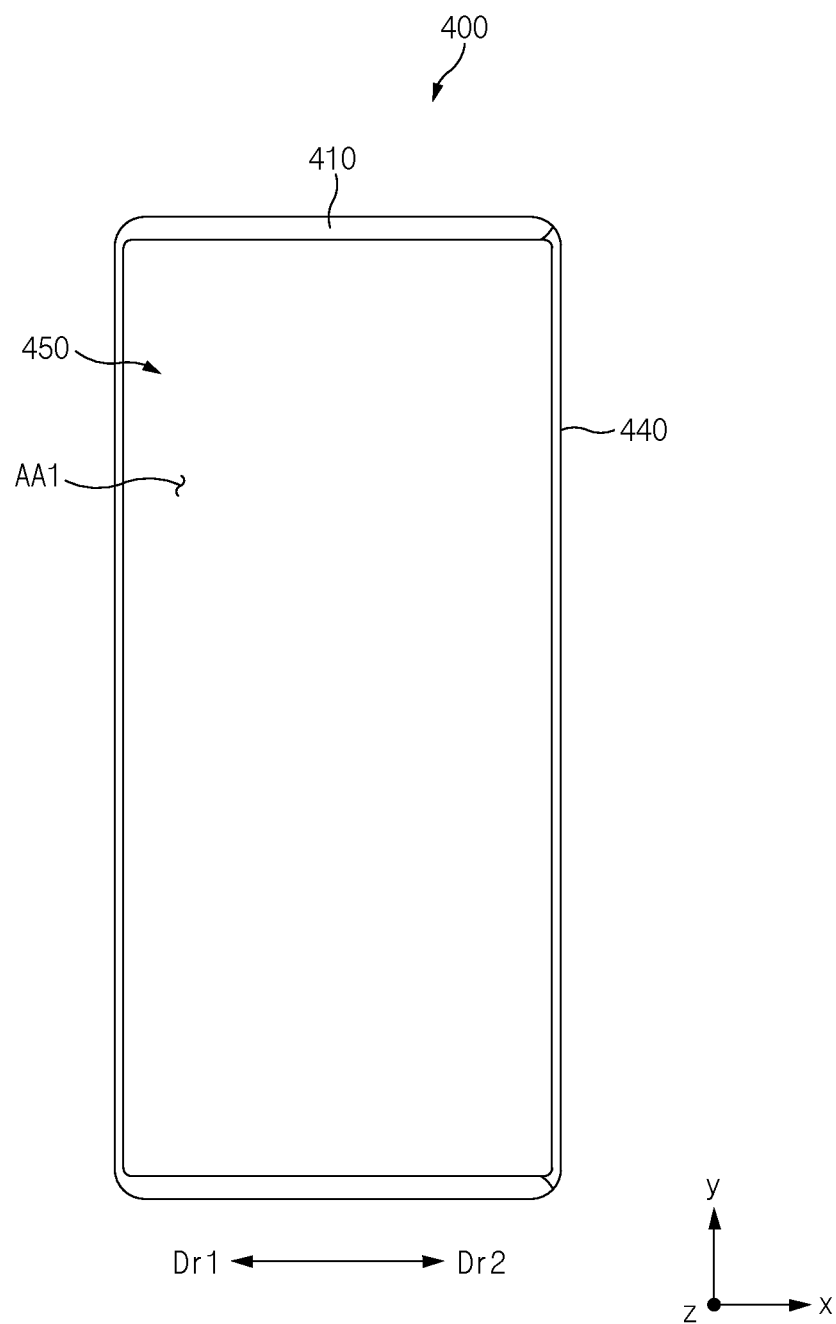
FIG. 4 is a diagram showing a first state of an electronic device according to an embodiment of the disclosure.

FIG. 4 is a diagram showing a first state of an electronic device according to an embodiment of the disclosure.

Figure 5:
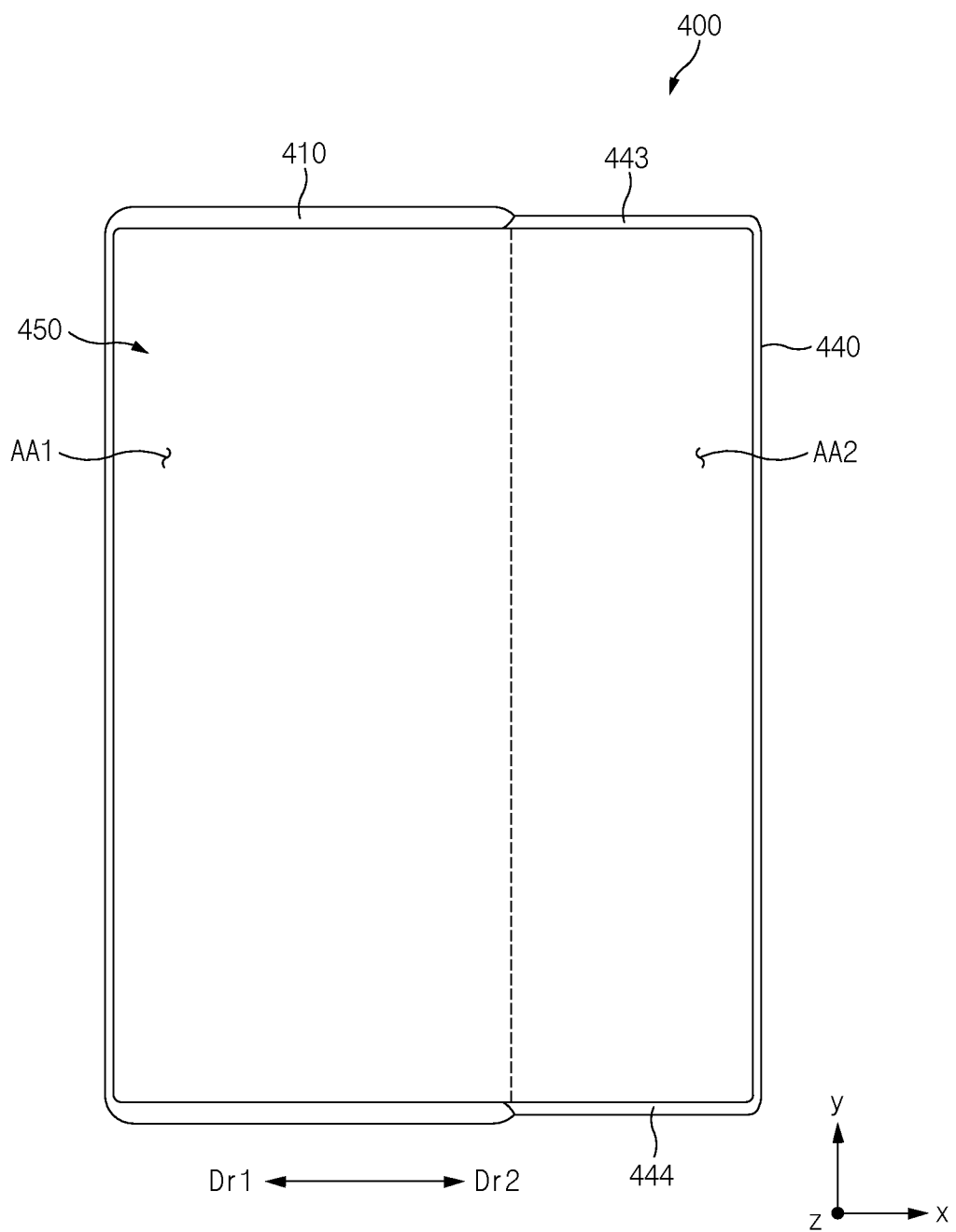
FIG. 5 is a diagram showing a second state of an electronic device according to an embodiment of the disclosure.

FIG. 5 is a diagram showing a second state of an electronic device according to an embodiment of the disclosure.

Referring to FIGS. 4 and 5, an electronic device 400 (e.g., the electronic device 101 in FIG. 1) according to one embodiment may include a housing and a display 450. The housing may include a first structure 410 and a second structure 440.

In one embodiment, the electronic device 400 may be of a slidable type or a rollable type. The electronic device 400 may include the first state (e.g., a closed state or a retracted state) and the second state (e.g., an opened state or an extended state). The first state and the second state may be determined based on a relative position of the second structure 440 with respect to the first structure 410. The electronic device 400 may be deformable into between the first state and the second state via a user's manipulation or a mechanical operation.

In one embodiment, the first state may refer to a state in which an area (or a size) of the display 450 visually exposed in a frontward direction of the electronic device 400 is relatively reduced. The second state may refer to a state in which the area (or the size) of the display 450 exposed in a frontward direction of the electronic device 400 is relatively enlarged. For example, the second state may be a state in which the area of the display 450 visually exposed in a frontward direction of the electronic device 400 is larger than that in the first state. Further, in the first state, a portion (e.g., side portions 443 and 444 respectively facing in +y/−y axis directions) of the second structure 440 may be located inwardly (or outwardly) of the first structure 410, such that the second structure 440 may be in a closed state with respect to the first structure 410. In the second state, the portions 443 and 444 of the second structure 440 exit from the first structure 410 such that the second structure 440 may be in an opened state with respect to the first structure 410. In one embodiment, the electronic device 400 may further include a third state (hereinafter, also referred to as an intermediate state) between the first state and the second state. For example, the intermediate state may have a larger area of the display 450 that is visually exposed in a frontward direction of the electronic device 400 compared to that in the first state, and a smaller area of the display 450 that is visually exposed in a frontward direction of the electronic device 400 compared to that in the second state.

In one embodiment, the first structure 410 and the second structure 440 may be coupled to each other such that the first structure 410 and the second structure 440 slides relative to each other. The second structure 440 may be slidably coupled to one side of the first structure 410. For example, the first structure 410 may be a fixed structure, and the second structure 440 may be a structure that is relatively movable with respect to the first structure 410. The second structure 440 may be coupled to one side of the first structure 410 so as to be slidable in both directions (e.g., +x/−x axis directions) with respect to the first structure 410.

In another embodiment, a long side surface (e.g., a surface extending in the y-axis direction) of the second structure 440 may slide in both directions (e.g., the +y/−y-axis directions). In still another embodiment, the electronic device 400 includes a plurality of second structures 440. One second structure may slide in one direction (e.g., +x-axis direction or +y-axis direction), and the other second structure may slide in the opposite direction (e.g., −x-axis direction or −y-axis direction).

In one embodiment, the electronic device 400 may be deformed into the first state and the second state as the second structure 440 slides with respect to the first structure 410. For example, in the electronic device 400, the second structure 440 may move in a second direction DR2 with respect to the first structure 410 in the first state (e.g., the state of FIG. 4) such that the electronic device 400 may be deformed into the second state (e.g., the state of FIG. 5). Conversely, the second structure 440 may move in a first direction DR1 with respect to the first structure 410 in the second state such that the electronic device 400 may be deformed into the first state.

In one embodiment, the display 450 may change the size (or the area) of the area thereof exposed in a frontward direction of the electronic device 400 in response to the sliding operation of the second structure 440. While the display 450 is supported on at least one of the first structure 410 or the second structure 440, a size of the exposed area thereof may increase or decrease according to the sliding operation of the second structure 440. The display 450 may include at least a partially flexible part.

In one embodiment, the display 450 may include a basic area AA1 and an extended area AA2 extending from the basic area AA1. The basic area AA1 may be maintained at a state exposed in a frontward direction of the electronic device 400. The extended area AA2 may have a variable size of an area exposed in a frontward direction of the electronic device 400 according to the state of the electronic device 400. The extended area AA2 may extend from one side of the basic area AA1. For example, the basic area AA1 may mean a partial area of the display 450 visually exposed in a frontward direction of the electronic device 400 in the first state. The extended area AA2 may be refer to an area which is located inside the electronic device 400 in the first state, and whose at least a portion extends out of the electronic device 400 and is visually exposed in a frontward direction of the electronic device 400 in the second state.

In one embodiment, in the first state, the basic area AA1 may be located across a front surface of the electronic device 400, and the extended area AA2 may be located inside the first structure 410. The second state may refer to a state in which at least a portion of the extended area AA2 together with the basic area AA1 are located across the front surface of the electronic device 400. In the electronic device 400, the extended area AA2 is additionally exposed in a frontward direction of the electronic device 400 in the second state, so that a size of the exposed area of the display 450 may increase. The display 450 may include a display area which is visually exposed in a frontward direction of the electronic device 400 and in which predetermined visual information (or screen) is displayed. For example, in the first state, the display area may correspond to the basic area AA1. In the second state, the display area may correspond to a sum of a portion of the extended area AA2 and the basic area AA1. In the second state, the electronic device 400 may provide an extended display area larger than that in the first state as the screen may be displayed on the portion of the extended area AA2 together with the basic area AA1 in the second state.

In one embodiment, the electronic device 400 may be manually switched to the first state and/or the second state by the user or a driving mechanism (e.g., a drive motor, a reduction gear module and/or a gear assembly) disposed inside the first structure 410 or the second structure 440. According to one embodiment, an operation of the driving mechanism may be triggered based on user input. According to one embodiment, the user input for triggering the operation of the driving mechanism may include a touch input, a force touch input, and/or a gesture input on the display 450. In another embodiment, the user input for triggering the operation of the driving mechanism may include a voice input, or an input to a physical button disposed on an outer face of the first structure 410 and/or the second structure 440 and exposed outwardly.

Figure 6:
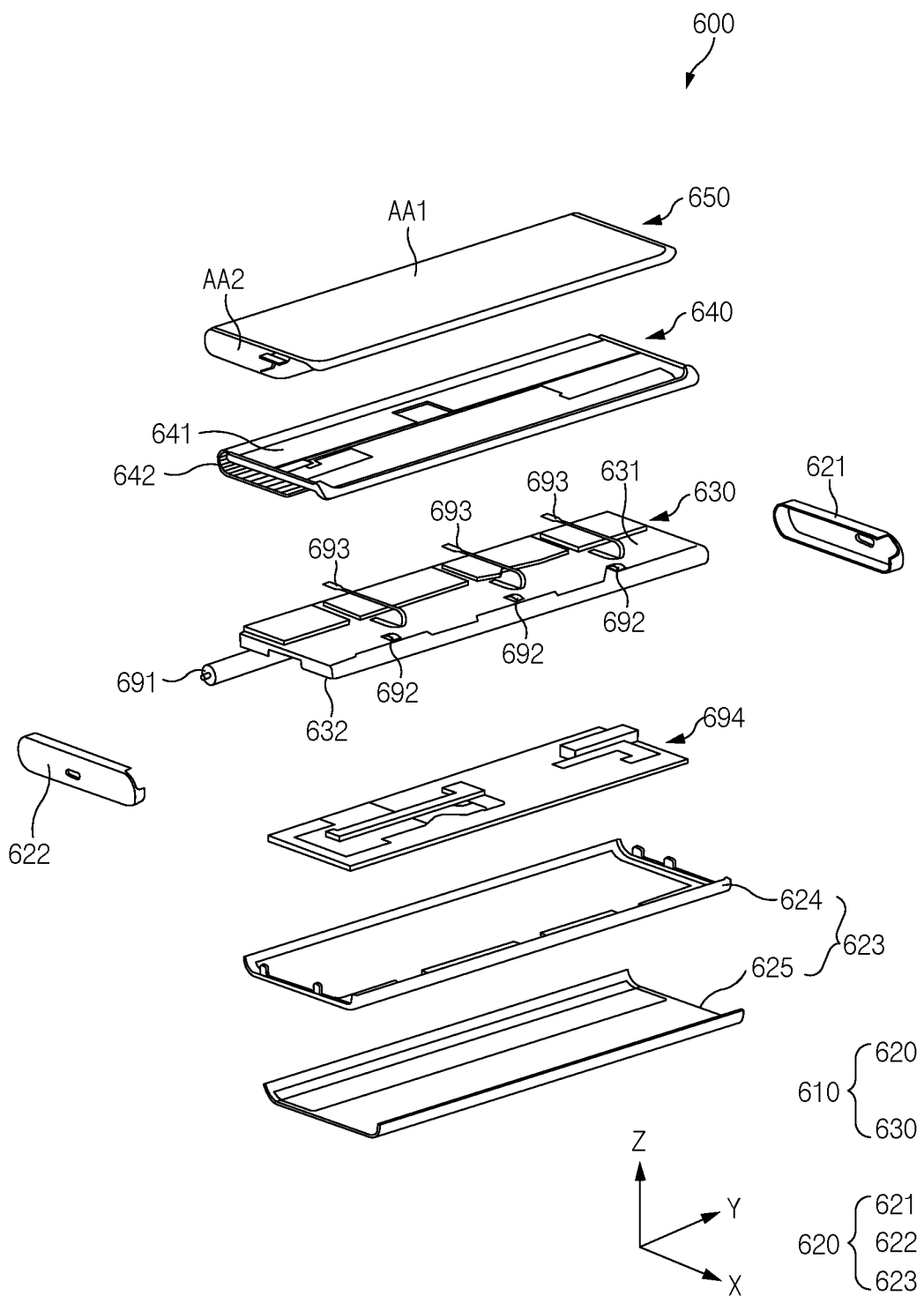
FIG. 6 is an exploded perspective view of an electronic device according to an embodiment of the disclosure.

FIG. 6 is an exploded perspective view of an electronic device according to an embodiment of the disclosure.

Referring to FIG. 6, an electronic device 600 according to one embodiment may include a housing composed of a first structure 610 and a second structure 640, a display 650, a first roller 691, a second roller 692, a tension belt 693, and a circuit board 694.

In one embodiment, the first structure 610 may include a casing 620 and a bracket 630. The bracket 630 may be coupled to the casing 620, and at least a portion thereof may be surrounded with the casing 620. For example, the bracket 630 may be fixed to the casing 620. The casing 620 and the bracket 630 may be movable relative to the second structure 640 in response to a sliding operation of the second structure 640. The casing 620 and the bracket 630 may act as a reference for sliding movement of the second structure 640 and the display 650.

In one embodiment, the casing 620 may define at least a portion of an outer surface of the electronic device 600. The casing 620 may include a first side member 621, a second side member 622, and a rear member 623. The first side member 621 and the second side member 622 may face toward each other in a direction substantially perpendicular to a sliding direction (e.g., the first direction DR1 and the second direction DR2) of the second structure 640. The rear member 623 may be disposed between the first side member 621 and the second side member 622, and may be connected to each of the first side member 621 and the second side member 622. The first side member 621, the second side member 622, and the rear member 623 may be coupled to each other to define a space in which at least some of other components (e.g., the bracket 630, the second structure 640, and the circuit board 694) of the electronic device 600 may be disposed.

In one embodiment, the rear member 623 may include a frame 624 and a cover 625. For example, the frame 624 may be coupled to the bracket 630. The cover 625 may be coupled to the frame 624 to form at least a portion of the rear surface of the electronic device 600. A space in which the second structure 640 and the extended area AA2 of the display 650 are accommodated may be located between the cover 625 and the bracket 630.

According to the illustrated embodiment, the first side member 621, the second side member 622, the frame 624 and/or the rear cover 625 may be formed as separate components, and may be assembled with each other or may be combined with each other. However, the disclosure is not limited thereto. According to various embodiments of the disclosure, the first side member 621, the second side member 622, the frame 624 and the rear cover 625 are integrally formed with each other to constitute one part.

In one embodiment, the bracket 630 may be disposed to at least partially overlap the second structure 640. A first surface 631 (e.g., a surface facing in the +z-axis direction or a top surface based on FIG. 6) of the bracket 630 may face toward the plate portion 641 of the second structure 640. A second surface 632 (e.g., a surface facing in the −z-axis direction or a bottom surface based on FIG. 6) of the bracket 630 may face toward the circuit board 694. The circuit board 694 may be disposed on the second surface 632 of the bracket 630.

In one embodiment, the second structure 640 may be disposed to surround at least a portion of the bracket 630. The second structure 640 may include the plate portion 641 supporting a portion of the basic area AA1 of the display 650 and a multi-joint member 642 that supports another portion of the basic area AA1 and a portion of the extended area AA2 of the flexible display (i.e., display 650). For example, the multi-joint member 642 may extend from the plate portion 641, and may be bendable. The multi-joint member 642 may be at least partially curved in response to the sliding operation of the second structure 640.

In one embodiment, the multi-joint member 642 may be coupled to the first roller 691. The multi-joint member 642 may include a plurality of bars extending in a direction substantially parallel to a rolling axis R of the first roller 691.

For example, the multi-joint member 642 may include a flexible track or a hinge rail. According to one embodiment, the plate portion 641 may be configured to slide in the first direction DR1 or the second direction DR2. The multi-joint member 642 may be configured such that a portion thereof rotates via the first roller 691 and the other portion thereof slides in the first direction DR1 or the second direction DR2.

In one embodiment, the first roller 691 may be disposed on one side surface of the bracket 630. The first roller 691 may be rotatably coupled to the bracket 630. For example, the first roller 691 may rotate in both directions about the rolling axis R according to the sliding operation of the second structure 640. The first roller 691 may contact a portion of the multi-joint member 642 of the second structure 640. For example, the second structure 640 may be disposed such that the multi-joint member 642 surrounds at least a portion of the first roller 691. The first roller 691 may be configured to rotate a portion of the multi-joint member 642. The first roller 691 may contact an area of the multi-joint member 642 varying according to the state change of the electronic device 600.

In one embodiment, the second structure 640 may be slidably coupled to the bracket 630 via the tension belt 693 and the second roller 692. The tension belt 693 may connect an end of the plate portion 641 of the second structure 640 and an end of the multi-joint member 642 to each other. The second roller 692 may be configured to rotate in the same direction as a rotation direction of the first roller 691 according to the sliding operation of the second structure 640. For example, the tension belt 693 may be configured to provide tension to the multi-joint member 642 while being disposed between the plate portion 641 and the multi-joint member 642. According to one embodiment, when the plate portion 641 moves in the first direction DR1, one end of the tension belt 693 connected to the plate portion 641 may move in the first direction DR1, while the opposite end of the tension belt 693 connected to the multi-joint member 642 may move in the second direction DR2. Conversely, when the plate portion 641 moves in the second direction DR2, one end of the tension belt 693 may move in the second direction DR2, while the opposite end of the tension belt 693 may move in the first direction DR1. However, the illustrated embodiment is illustrative. According to various embodiments, the electronic device 600 may not include at least one of the second roller 692 or the tension belt 693.

In one embodiment, the display 650 may be disposed on the second structure 640. For example, the display 650 may be coupled to the second structure 640 such that the display 650 together with the second structure 640 perform sliding movement with respect to the first structure 610. The display 650 may include the basic area AA1 and the extended area AA2 extending from the basic area AA1. For example, the basic area AA1 may mean an area visually exposed in a frontward direction of the electronic device 600 in the first state. The extended area AA2 may refer to an area which may be located inside the electronic device 600 in the first state, and whose at least a portion moves out of the electronic device 600 and thus is visually exposed in a frontward direction of the electronic device 600 in the second state.

The electronic device 600 according to an embodiment may be configured such that in the first state, the basic area AA1 may be visually exposed in a frontward direction of the electronic device 600, and in the second state, at least a portion of the extended area AA2 together with the basic area AA1 may be visually exposed in a frontward direction of the electronic device 600. A position of the extended area AA2 may vary as at least a portion thereof rotates together with the rotation of the first roller 691. For example, as the second structure 640 moves in the first direction DR1 with respect to the first structure 610, the extended area AA2 together with the basic area AA1 may be disposed on the front surface of the electronic device 600. Further, the extended area AA2 may be accommodated in a space between the bracket 630 and the rear member 623 as the second structure 640 moves in the second direction DR2 with respect to the first structure 610.

In one embodiment, the circuit board 694 may be disposed in the first structure 610. The circuit board 694 may be disposed between the bracket 630 and the rear member 623. For example, the circuit board 694 may be disposed inside the electronic device 600 while being supported on the bracket 630. The circuit board 694 may be coupled to at least a partial area of the second surface 632 of the bracket 630 and thus may be fixed to the first structure 610. The circuit board 694 together with the first structure 610 may move relative to the second structure 640 during the sliding operation of the second structure 640.

In one embodiment, the circuit board 694 may include a printed circuit board (PCB), a flexible PCB (FPCB), or a rigid-flexible PCB (RFPCB). Various electronic components included in the electronic device 600 may be electrically connected to the circuit board 694. A processor (e.g., the processor 120 in FIG. 1), a memory (e.g., the memory 130 in FIG. 1) and/or an interface (e.g., the interface 177 in FIG. 1) may be disposed in the circuit board 694). For example, the processor may include a main the processor and/or an auxiliary processor. The main the processor and/or the auxiliary processor may include one or more of a central processing unit, an application the processor, a graphics processing unit, and an image signal processor, a sensor hub processor or a communication processor. For example, the memory may include a volatile memory or a non-volatile memory. For example, the interface may include a high definition multimedia interface (HDMI), a universal serial bus (USB) interface, an SD card interface, and/or an audio interface. Further, the interface may electrically or physically connect the electronic device 600 to an external electronic device, and may include a USB connector, an SD card/MMC connector, or an audio connector.

In one embodiment, a battery (e.g., the battery 189 in FIG. 1) may supply power to at least one component of the electronic device 600. The battery may be integrally disposed inside the electronic device 600 or may be disposed detachably from the electronic device 600. According to various embodiments of the disclosure, the battery may be disposed inside the electronic device 600 while the battery together with the circuit board 694 are supported on the bracket 630. The battery may be coupled to at least a partial area of the second surface 632 of the bracket 630. The battery may be substantially coplanar with the circuit board 694. The battery together with the first structure 610 may move relative to the second structure 640 during the sliding operation of the second structure 640.

Figure 7:
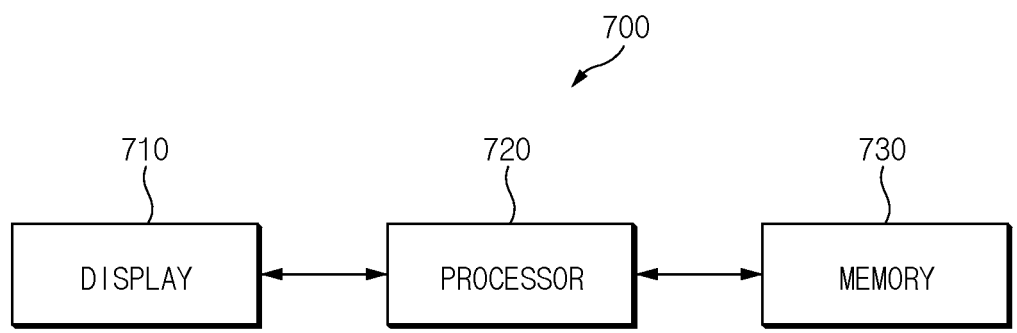
FIG. 7 is a block diagram showing an electronic device according to an embodiment of the disclosure.

FIG. 7 is a block diagram showing an electronic device according to an embodiment of the disclosure.

Referring to FIG. 7, an electronic device 700 according to one embodiment (e.g., the electronic device 101 in FIG. 1) may include a display 710 (e.g., the display module 160 in FIG. 1), a memory 730 (e.g., the memory 130 in FIG. 1) and a processor 720 (e.g., the processor 120 in FIG. 1).

At least a portion of the display 710 may include a flexible area. According to one embodiment, the display 710 may be configured to extend and retract. For example, the display 710 may include at least one of a slideable display, a foldable display, or a rollable display.

Depending on the state of the electronic device 700, a size of the display area (or the exposed area) of the display 710 may increase or decrease. In the first state (e.g., the retracted state) of the electronic device 700, the display area of the display 710 may retract, and in the second state (e.g., the extended state), the display area of the display 710 may extend. For example, in the first state of the electronic device 700, at least a portion of the display 710 may be disposed in a rolled or bent state and within the electronic device 700, and thus may not be visually exposed. In the second state of the electronic device 700, the at least a portion of the display 710 may be unfolded and thus visually exposed.

According to one embodiment, the display 710 may extend or retract in an automatic, semi-automatic, or manual manner. For example, the display 710 may further receive a driving motor (not shown) therein. The automatic display 710 may automatically extend or retract using the driving motor based on a specified signal created by the processor 720. For example, in the semi-automatic manner, the display 710 of the electronic device 700 may automatically extend based on an operation of the drive motor based on a specified signal created by the processor 720. Then, the display 710 of the electronic device 700 may retract by a user directly applying a force to the display 710 of the electronic device 700 in the extended state. For example, in the manual manner, the display 710 of the electronic device 700 may extend or retract by a user directly applying a force to the display 710 of the electronic device 700. The display as described with reference to the drawings to be described later may extend or retract in the above-described automatic, semi-automatic, or manual manner. In another example, the display 710 may extend based on an input applied to a pre-specified area. When an input provided from the user (e.g., an input based on a physical key, a touch input, a long press input, or an input of a specified pattern (e.g., knocks)) is applied to a predetermined area of the display 710 in the state in which the display 710 has retracted, the display 710 may automatically extend. In various embodiments, the display 710 may extend when an input provided from an external input device (not shown) (e.g., a stylus pen) is applied to a predetermined area in the state in which the display 710 has retracted.

The memory 730 may store therein at least one program, at least one application, data, or instructions executed by the processor 720. According to one embodiment, the memory 730 may include at least a portion of the memory 130 shown in FIG. 1. According to one embodiment, the memory 730 may store therein information or instructions for performing at least a portion of an operation of the electronic device 700 to be described later. According to one embodiment, the memory 730 may store therein instructions related to a plurality of applications executed by the processor 720.

The processor 720 may detect the state of the electronic device 700 using a sensor (e.g., the sensor module 176 of FIG. 1). For example, the sensor may be at least one of a magnetic sensor such as a hall sensor, a proximity sensor, an illuminance sensor, a touch sensor, a bending sensor, and an infrared sensor, or a combination thereof. For example, the processor 720 may identify a rolling state or a sliding state of the display 710. The processor 720 may identify rolling in/out (or sliding in/out) and a rolling amount (or a sliding amount). According to an embodiment, the processor 720 may acquire state information about the state of the electronic device 700 from the sensor.

According to one embodiment, in order to detect the state of the electronic device 700, the processor 720 may include another sensor for checking movement (rotation) of a magnetic body (e.g., in the x-axis, y-axis, and z-axis directions). For example, the electronic device 700 may include a TMR sensor (a tunnel magneto-resistance sensor) and thus may use a resistance value that changes based on relative angles between a plurality of magnetic units of the TMR sensor to check movement (rotation) of the magnetic body. Further, according to another embodiment, the electronic device 700 may check the movement (rotation) of the magnetic body using an anisotropic magneto-resistance (AMR) sensor or a giant magneto-resistance (GMR) sensor.

In one embodiment, the sensor may include at least one of an accelerometer, a gyro sensor (e.g., a gyroscope), and a geomagnetic sensor. Alternatively, the sensor may detect an inclination angle of the electronic device 700 with respect to a ground surface and/or a direction in which the electronic device 700 faces in a three-dimensional coordinate system, using sensed data acquired from at least one of the accelerometer, the gyro sensor or the geomagnetic sensor. However, the disclosure is not limited thereto. Various sensors capable of obtaining information about the inclination angle of the electronic device 700 may be used. For example, the accelerometer may sense information about linear motion of the electronic device 700 and/or acceleration of the electronic device 700 in three axes. The gyro sensor may sense information related to the rotation of the electronic device 700, and the geomagnetic sensor may sense information about a direction in which the electronic device 700 faces in an absolute coordinate system.

According to one embodiment, the processor 720 may create a virtual coordinate space based on an azimuth (e.g., a yaw, pitch and/or roll value) as measured by a 9-axis motion sensor (e.g., the accelerometer, the gyro sensor, and the geomagnetic sensor). The processor 720 may define one area of the virtual coordinate space as a landscape range, and another area thereof as a portrait range. According to one embodiment, when a current state of the electronic device 700 is included in the landscape range, the processor 720 may determine that the electronic device 700 has a landscape orientation. For example, the landscape orientation of the electronic device 700 may represent a state in which parallel long sides of the electronic device 700 are parallel to a horizontal axis parallel to the ground. According to one embodiment, when the current state of the electronic device 700 is included in the portrait range, the processor 720 may determine that the electronic device 700 has a portrait orientation. For example, the portrait orientation of the electronic device 700 may represent a state in which the parallel long sides of the electronic device 700 are parallel to a vertical axis perpendicular to the ground.

The processor 720 may display a preview image for a background screen on the display 710 in response to execution of an application for setting the background screen. The processor 720 may display a preview image for a background screen using a selected image based on a user input for selecting one image. According to one implementation, the processor 720 may sequentially (or successively) display areas corresponding to background screens respectively in at least two states of the electronic device 700 in the selected image as a preview image on the display 710. For example, the processor 720 may successively display an area of an image to be displayed as a background screen in a detected current state of the electronic device 700 and an area of an image to be displayed as a background screen in another state different from the current state as a preview image on the display 710.

When the detected state of the electronic device 700 is the first state, the processor 720 may sequentially (or successively) display a first preview image corresponding to preview for a background screen in the first state and a second preview image corresponding to preview for a background screen in the second state on the display 710 which is in the first state. The first preview image may include a first area of the selected image. The first area may be specified by a user input. The second preview image may include a second area of the selected image. The processor 720 may specify the second area in the selected image based on the specified first area. The processor 720 may specify the first area and the second area including the first area and one area (e.g., a third area) adjacent to the first area. For example, when the detected state of the electronic device 700 is the first state, the processor 720 may display the first area of the selected image as a preview image, and then display the second area including the first area of the image and one area (e.g., the third area) adjacent to the first area as a preview image on the display 710. The processor 720 may change display attribute (e.g., transparency, saturation, or brightness) of at least a portion of the second preview image.

When the detected state of the electronic device 700 is the second state, the processor 720 may sequentially (or successively) display a third preview image corresponding to the second state and a fourth preview image corresponding to the first state on the display 710 which is in the second state. The third preview image may include a fourth area of the selected image. The fourth area may be specified by a user input. The fourth preview image may include a fifth area of the selected image. The processor 720 may specify a fifth area in the selected image based on the specified fourth area. The processor 720 may specify one area in the fourth area as the fifth area. For example, when the detected state of the electronic device 700 is the second state, the processor 720 may display the fourth area of the selected image as a preview image, and then display the fifth area as one area within the fourth area of the image as a preview image. The processor 720 may change display attribute (e.g., transparency, saturation, or brightness) of the fourth preview image. According to one embodiment, the third preview image may be substantially identical to the second preview image, and the fourth preview image may be substantially identical to the first preview image. For example, the fourth area of the image may be substantially equal to the second area of the image, while the fifth area of the image may be substantially equal to the first area of the image.

The processor 720 may detect a state change of the electronic device 700. When the processor 720 detects a state change of the electronic device 700, the processor 720 may change and display a preview image in a corresponding manner to the state change of the electronic device 700 on the display 710. For example, when the extended state of the electronic device 700 is detected, the processor 720 may extend and display the first area in the first preview image or the second preview image in proportion to the extension of the display area of the display 710. In another example, when the retracted state of the electronic device 700 is detected, the electronic device 700 may reduce and display the third preview image in proportion to the reduction of the display area of the display 710.

Hereinafter, with reference to FIG. 8, an electronic device according to one embodiment will be described.

Figure 8:
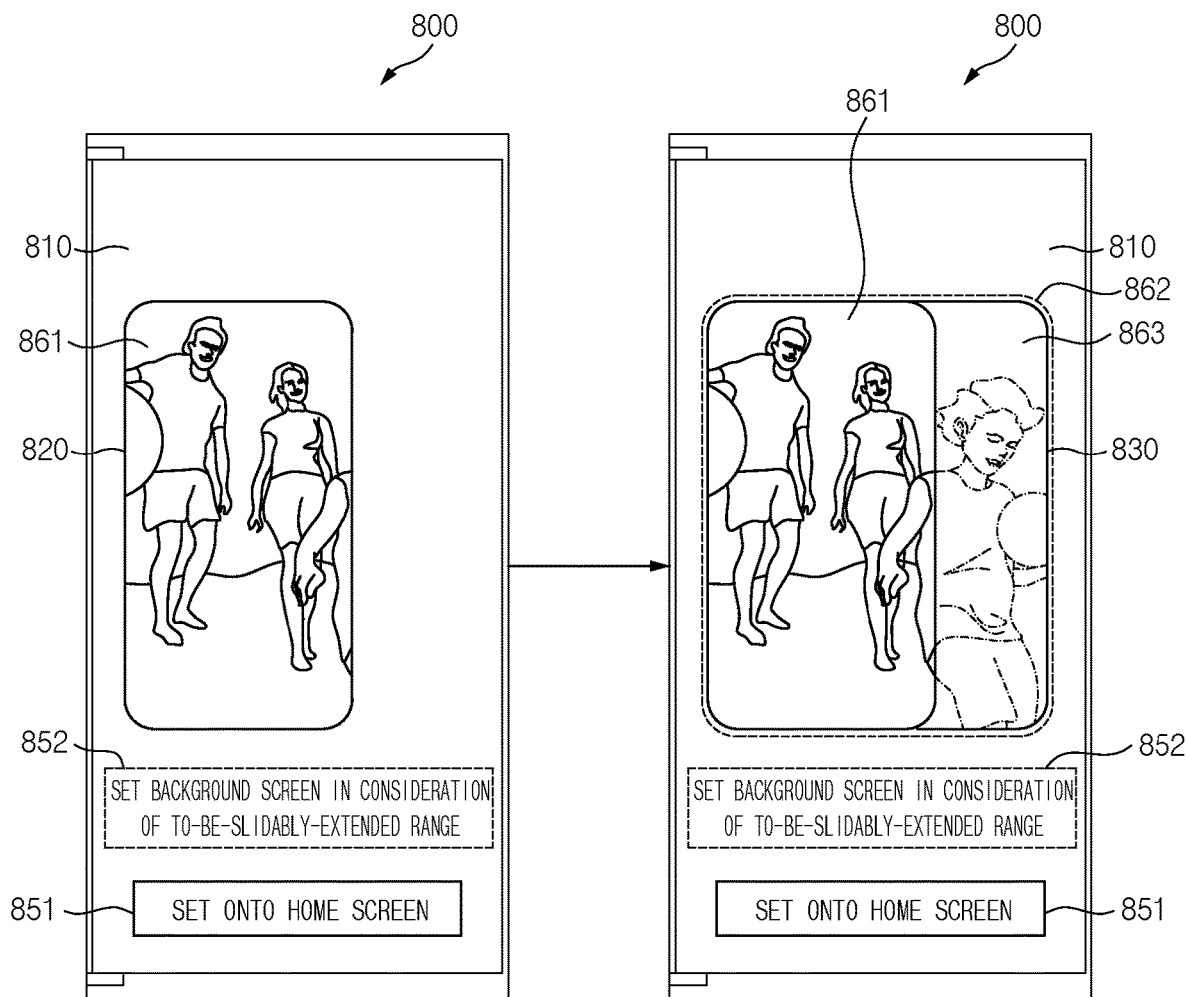
FIG. 8 is a diagram showing an electronic device that displays a preview image according to an embodiment of the disclosure.

FIG. 8 is a diagram illustrating the electronic device 800 that displays preview images 820 and 830 according to an embodiment of the disclosure. Hereinafter, an operation of the electronic device 800 may be referred to as an operation of a processor (e.g., the processor 120 in FIG. 1).

Referring to FIG. 8, the electronic device 800 according to one embodiment may display the preview images 820 and 830 for a background screen to be set based on a specified image on a display 810. The specified image may be an image selected by a user input for selecting an image. For example, the electronic device 800 may display the preview images 820 and 830 for the background screen on the display 810 in response to execution of a background screen setting application. According to one embodiment, the electronic device 800 may display a changed (or replaced) image as the preview images 820 and 830 based on a user input (e.g., a user input for an image replacement icon).

When the electronic device 800 according to one embodiment is in the first state (e.g., the retracted state), the electronic device 800 may display the first preview image 820 corresponding to a background screen in the first state state) and the second preview image 830 corresponding to a background screen corresponding to the second state (e.g., the extended state) the display 810 which is in the first state. The electronic device 800 according to one embodiment may display sequentially (or successively) one and the other of the first preview image 820 and the second preview image 830 based on a current state of the electronic device 800. The electronic device 800 according to one embodiment may display sequentially the first preview image 820 and the second preview image 830 when the current state of the electronic device 800 is the first state. For example, the electronic device 800 may display the first preview image 820 for a specified time duration and then display the second preview image 830 on the display 810 which is in the first state. In another example, the electronic device 800 may alternately display the first preview image 820 and the second preview image 830 on the display 810. According to one embodiment, the electronic device 800 may display sequentially (or successively) the first preview image 820 and the second preview images 830 on the display 810, based on a user input (e.g., touch, swipe) to one user interface (e.g., an icon for background screen setting).

The first preview image 820 may correspond to a background screen displayed in the first state of the electronic device 800. An aspect ratio of the first preview image 820 may correspond to an aspect ratio of a reduced display area of the display 810 visually exposed in the first state of the electronic device 800. The first preview image 820 may include at least one area of an image. For example, the first preview image 820 may include a first area 861 of the image. The first area 861 may be specified (or changed) based on a user input (e.g., touch, swipe).

The second preview image 830 may correspond to a background screen displayed in the second state of the electronic device 800. The aspect ratio of the second preview image 830 may correspond to an aspect ratio of an enlarged display area of the display 810 visually exposed in the second state of the electronic device 800. The second preview image 830 may include the first area 861 of the image and at least one area adjacent to the first area 861. According to one embodiment, the second preview image 830 may include the first area 861 of the image and one area of the image adjacent to the first area 861 of the image in an extending direction (e.g., +x direction) of the display 810 in the second state of the electronic device 800. For example, the second preview image 830 may include a second area 862 composed of the first area 861 of the image, and a third area 863 adjacent to the first area 861. The display 810 of the electronic device 800 may extend in one direction (e.g., +x direction). In this case, the electronic device 800 may specify the first area 861 of the image and the third area 863 of the image adjacent to the first area 861 in the extending direction (e.g., the +x direction) as the second area 862. However, the extending direction of the display 810 is not limited as shown in FIG. 8. For example, the display 810 may extend in the −x direction or the y direction. In another example, the display 810 may extend in multiple directions.

The electronic device 800 may apply a specified effect when the first preview image 820 has been switched to the second preview image 830. For example, the electronic device 800 may display the first area 861 of the image, and may display the third area 863 of the image in addition to the first area 861 such that the third area 863 gradually appears in the extending direction (e.g., +x direction). The electronic device 800 according to one embodiment may use the display 810 to set the display attribute (e.g., transparency, saturation or brightness) of at least a portion of the second area 862 of the image in the second preview image 830 to be different from that of a remaining portion of the second area 862. The electronic device 800 may display the first area 861 of the image based on first display attribute, and display the third area 863 based on second display attribute that is at least partially different from the first display attribute. The electronic device 800 according to one embodiment may display the image such that the transparency of the third area 863 is higher than that of the first area 861. For example, the electronic device 800 may set the transparency of the first area 861 of the image to 0% and the transparency of the third area 863 to 50% and display the first and third areas on the display 810. When the electronic device 800 which is in the first state displays the second preview image 830 corresponding to the second state, the electronic device 800 may set the display attribute of the first area 861 and the display attribute of the third area 863 to be different from each other. Thus, an image area (e.g., the third area 863) that is additionally displayed when the display 810 extends may be intuitively identified by the user.

The electronic device 800 according to an embodiment may display a user interface (i.e., first icon 851, and first information 852) related to the background screen setting. For example, the user interface (i.e., first icon 851, and first information 852) may include a first icon 851 and first information 852 for background screen setting. For example, the first information 852 may include "Set a background screen in consideration of a to-be-slidably-extended range". The user interface (i.e., first icon 851, and first information 852) shown in FIG. 8 is only example. The disclosure is not limited to the illustrated example.

When receiving a user input to the first icon 851 from the user, the electronic device 800 may specify (or set) an image selected based on the first preview image 820 and the second preview image 830 as a background screen of the electronic device 800. For example, the electronic device 800 may set the background screen in the first state in response to selection of the first preview image 820 and set the background screen in the second state in response to selection of the second preview image 830. When the background screen has been set by the user input to the first icon 851, the electronic device 800 may display the background screen corresponding to the first preview image 820 on the display 810 which in in the retracted state, and may display the background screen corresponding to the second preview image 830 on the display 810 which in in the extended state.

Figure 9:
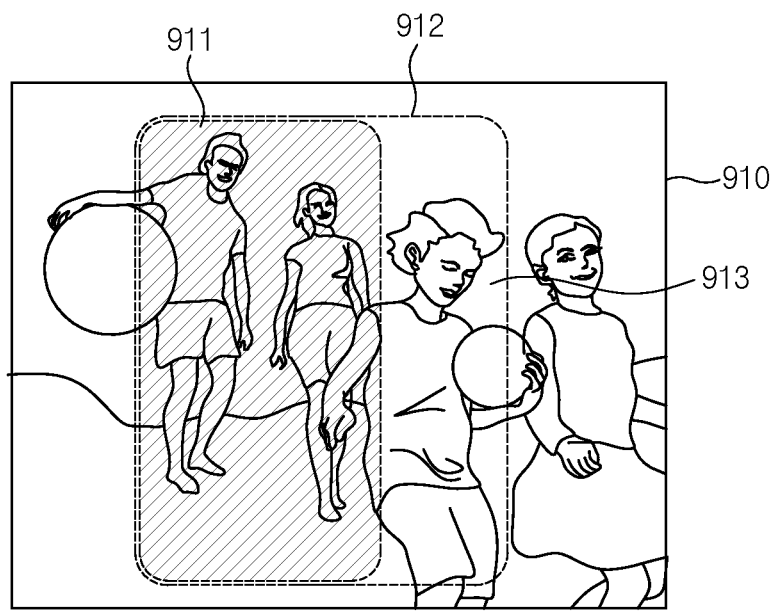
FIG. 9 is a view showing a first area of an image included in a first preview image and a second area of an image included in a second preview image according to an embodiment of the disclosure.

FIG. 9 shows a first area 911 (e.g., the first area 861 of FIG. 8) of an image 910 included in a first preview image (e.g., the first preview image 820 of FIG. 8), and a second area 912 (e.g., the second area 862 of FIG. 8) of the image 910 included in a second preview image (e.g., the second preview image 830 of FIG. 8) in an electronic device (e.g., the electronic device 800 of FIG. 8) according to one embodiment.

Referring to FIG. 9, the electronic device which is in the first state (e.g., the retracted state) may specify one area of the image 910 as the first area 911 based on a user input (or execution of a background screen setting application).

The electronic device may specify the second area 912 of the image 910 based on the first area 911. For example, the electronic device may specify the first area 911 and the third area 913 adjacent to the first area 911 in one direction (e.g., +x direction) as the second area 912. However, a location of the third area 913 shown in FIG. 9 is only an example. The disclosure is not limited thereto. The location of the third area 913 may be determined based on the extending direction of the display of the electronic device. For example, the electronic device may specify the first area 911 and an area adjacent to the first area 911 in another direction (e.g., −x direction or y direction) as the third area 913.

Hereinafter, with reference to FIG. 10, an electronic device according to one embodiment will be described.

Figure 10:
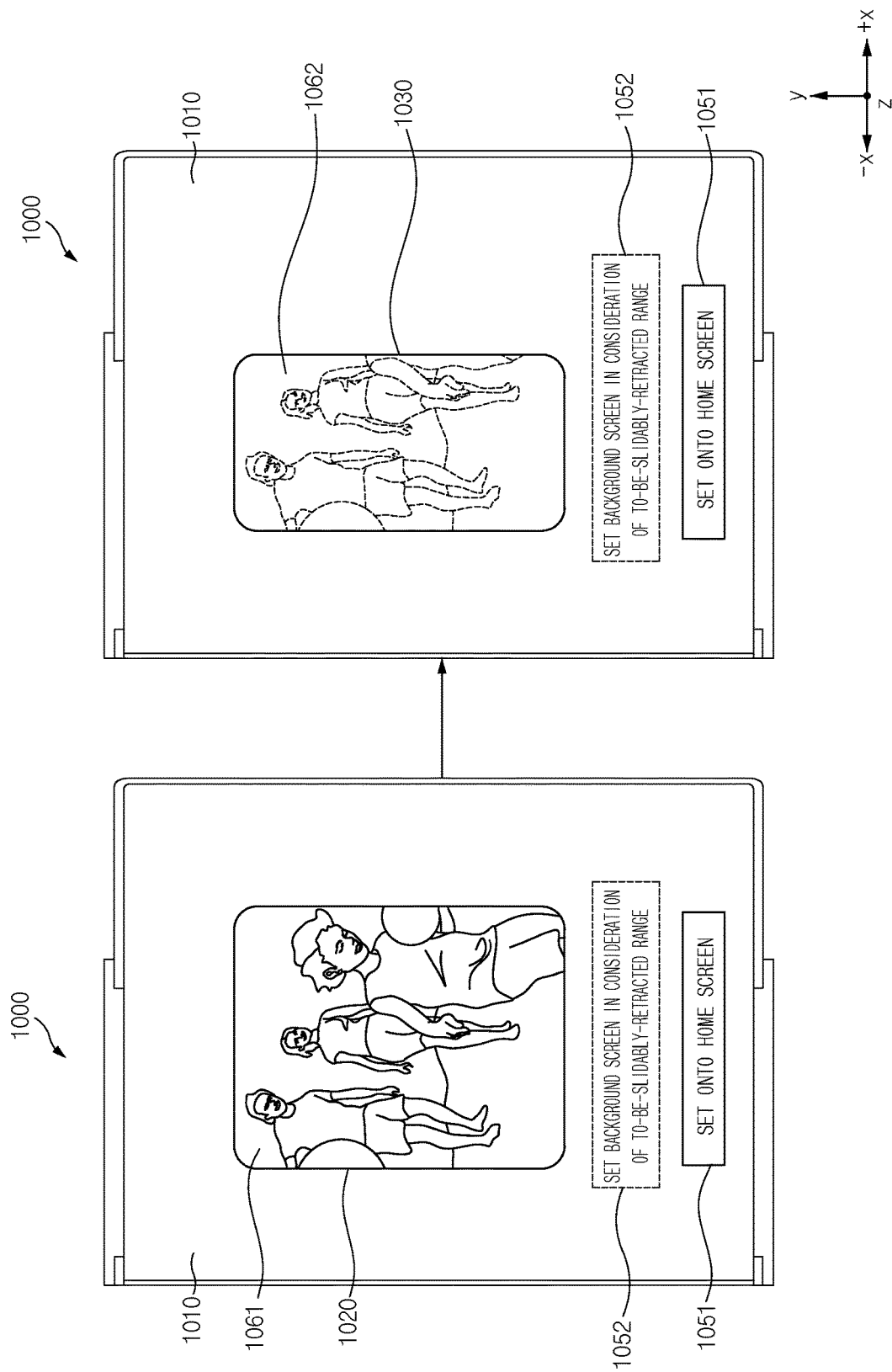
FIG. 10 is a diagram showing an electronic device that displays a preview image according to an embodiment of the disclosure.

FIG. 10 is a diagram showing the electronic device that displays a preview image according to an embodiment of the disclosure. Hereinafter, an operation of the electronic device may be referred to as an operation of a processor (e.g., the processor 120 in FIG. 1).

Referring to FIG. 10, an electronic device 1000 according to one embodiment may display preview images 1020 and 1030 on the display 1010. For example, the electronic device 1000 may display the preview images 1020 and 1030 for the background screen on the display 1010 in response to execution of the background screen setting application. According to one embodiment, the electronic device 1000 may display a changed (or replaced) image as the preview images 1020 and 1030 based on a user input (e.g., user input to an image replacement icon).

While the electronic device 1000 according to an embodiment is in the second state (e.g., the extended state), the electronic device 1000 may display a third preview image 1020 corresponding to the background screen in the second state and a fourth preview image 1030 corresponding to the background screen in the first state (e.g., the retracted state) on the display 1010. The third preview image 1020 may be substantially identical to the second preview image 830 of FIG. 8, while the fourth preview image 1030 may be substantially identical to the first preview image 820 of FIG. 8. The electronic device 1000 according to one embodiment may display sequentially (or successively) one and the other of the third preview image 1020 and the fourth preview image 1030 based on a current state of the electronic device 1000. The electronic device 1000 according to one embodiment may sequentially display the third preview image 1020 and the fourth preview image 1030 when the current state of the electronic device 1000 is the second state. For example, the electronic device 1000 may display the third preview image 1020 for a specified time duration and then display the fourth preview image 1030 on the display 1010 which is in the second state. In another example, the electronic device 1000 may alternately display the third preview image 1020 and the fourth preview image 1030 on the display 1010. According to one embodiment, the electronic device 1000 may display sequentially (or successively) the third preview image 1020 and the fourth preview image (1030) on the display 1010, based on the user input (e.g., touch, swipe) to an icon (e.g., an icon for background screen setting).

The third preview image 1020 may correspond to a background screen displayed in the second state of the electronic device 1000. An aspect ratio of the third preview image 1020 may correspond to an aspect ratio of an extended display area of the display 1010 visually exposed in the second state of the electronic device 1000. The third preview image 1020 may include at least one area of the image. For example, the third preview image 1020 may include a fourth area 1061 of the image. The fourth area 1061 may be substantially the same as the second area 862 of FIG. 8. The fourth area 1061 may be specified (or changed) by a user input (e.g., touch, swipe).

The fourth preview image 1030 may correspond to a background screen displayed in the first state of the electronic device 1000. An aspect ratio of the fourth preview image 1030 may correspond to an aspect ratio of the reduced display area of the display 1010 visually exposed in the first state of the electronic device 1000. The fourth preview image 1030 may include a fifth area 1062 of the image. The fifth area 1062 may be substantially the same as the first area 861 of FIG. 8. The fifth area 1062 of the image may be included in one area within the fourth area 1061. According to one embodiment, the fourth area 1061 may further include one area of the image adjacent to the fifth area 1062 of the image in the extending direction (e.g., +x direction) of the display 1010.

The electronic device 1000 may apply a specified effect when the device switches the third preview image 1020 to the fourth preview image 1030. For example, the electronic device 1000 may display the fourth area 1061 of the image, and then may display the fifth area 1062 such that an area of the fourth area 1061 other than fifth area 1062 gradually disappears in a retracting direction (e.g., −x direction).

The electronic device 1000 according to an embodiment may change the display attribute (e.g., transparency, saturation or brightness) of the fourth preview image 1030, and may display the fourth preview image 1030 to which the changed display attribute is applied on the display 1010. The electronic device 1000 may display the third preview image 1020 based on first display attribute, and display the fourth preview image 1030 based on second display attribute which is at least partially different from the first display attribute. The electronic device 1000 according to one embodiment may display the fourth preview image 1030 at transparency higher than transparency of the third preview image 1020. For example, the electronic device 1000 may set the transparency of the third preview image 1020 to 0% and set the transparency of the fourth preview image 1030 to 50% and display the same on the display 1010.

The electronic device 1000 according to an embodiment may display a user interface (i.e., first icon 1051, and first information 1052) related to background screen setting. For example, the user interface (i.e., first icon 1051, and first information 1052) may include a first icon 1051 and first information 1052 for background screen setting. For example, the first information 1052 may include "Set a background screen in consideration of a to-be-slidably-retracted range". The user interface 1051 and 1052 shown in FIG. 10 is only an example. The disclosure is not limited to the illustrated example.

Upon receiving the user input to the first icon 1051 from the user, the electronic device 1000 may specify (set) an image selected based on the third preview image 1020 and the fourth preview image 1030 as the background screen of the electronic device 1000. For example, the electronic device 1000 may set the background screen in the second state in response to selection of the third preview image 1020 and set the background screen in the first state in response to selection of the fourth preview image 1030. When the background screen has been set by the user input to the first icon 1051, the electronic device 1000 may display a background screen corresponding to the third preview image 1020 on the display 1010 which in in the extended state, and a background screen corresponding to the fourth preview image 1030 on the display 1010 which is in the retracted state.

Figure 11:
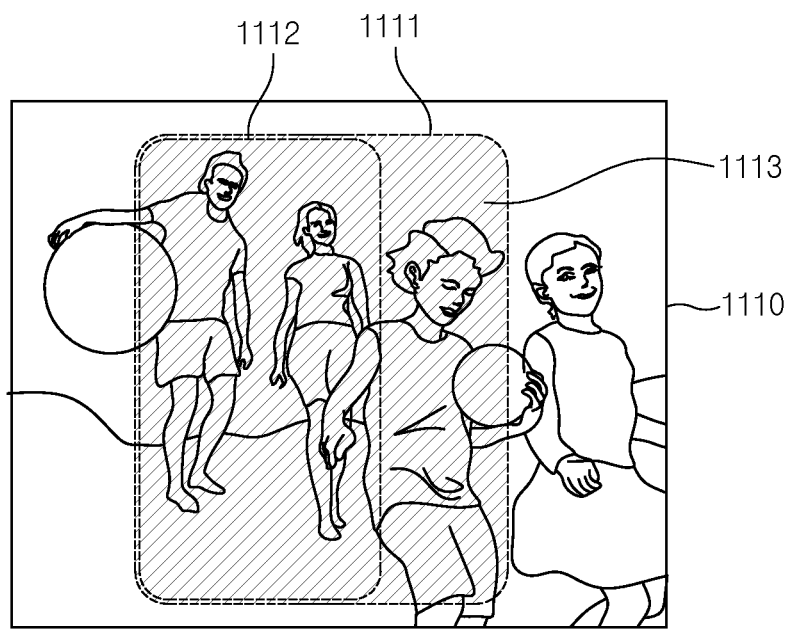
FIG. 11 is a view showing a first area of an image included in a first preview image and a second area of an image included in a second preview image according to an embodiment of the disclosure.

FIG. 11 shows a fourth area 1111 (e.g., the fourth area 1061 of FIG. 10) of an image 1110 included in a third preview image (e.g., the third preview image 1020 of FIG. 10), and a fifth area 1112 (e.g., the fifth area 1062 of FIG. 10) of the image 1110 included in a fourth preview image (e.g., the fourth preview image 1030 of FIG. 10) in an electronic device (e.g., the electronic device (1000) of FIG. 10) according to an embodiment of the disclosure.

Referring to FIG. 11, the electronic device which is in the second state (e.g., the extended state) may specify one area of an image 1110 as a fourth area 1111 based on a user input (or execution of a background screen setting application).

The electronic device may specify a fifth area 1112 of the image 1110 based on the fourth area 1111. The electronic device may specify a partial area of the fourth area 1111 in the image as the fifth area 1112. A location of the fifth area 1112 in the fourth area 1111 may be determined based on the retracting direction of the display of the electronic device. For example, the electronic device may specify one area located in the retracting direction (e.g., −x direction) of the display in the fourth area 1111 of the image as the fifth area 1112 and specify one area located in the extending direction (e.g., +x direction) of the display in the fourth area 1111 of the image as the sixth area 1113. For example, the fourth area 1111 of the image may include the fifth area 1112 and the sixth area 1113 adjacent to the fifth area 1112. However, positions of the fourth area 1111 and the fifth area 1112 shown in FIG. 11 are only examples. The disclosure is not limited thereto.

Hereinafter, with reference to FIG. 12, an electronic device according to one embodiment will be described.

Figure 12:
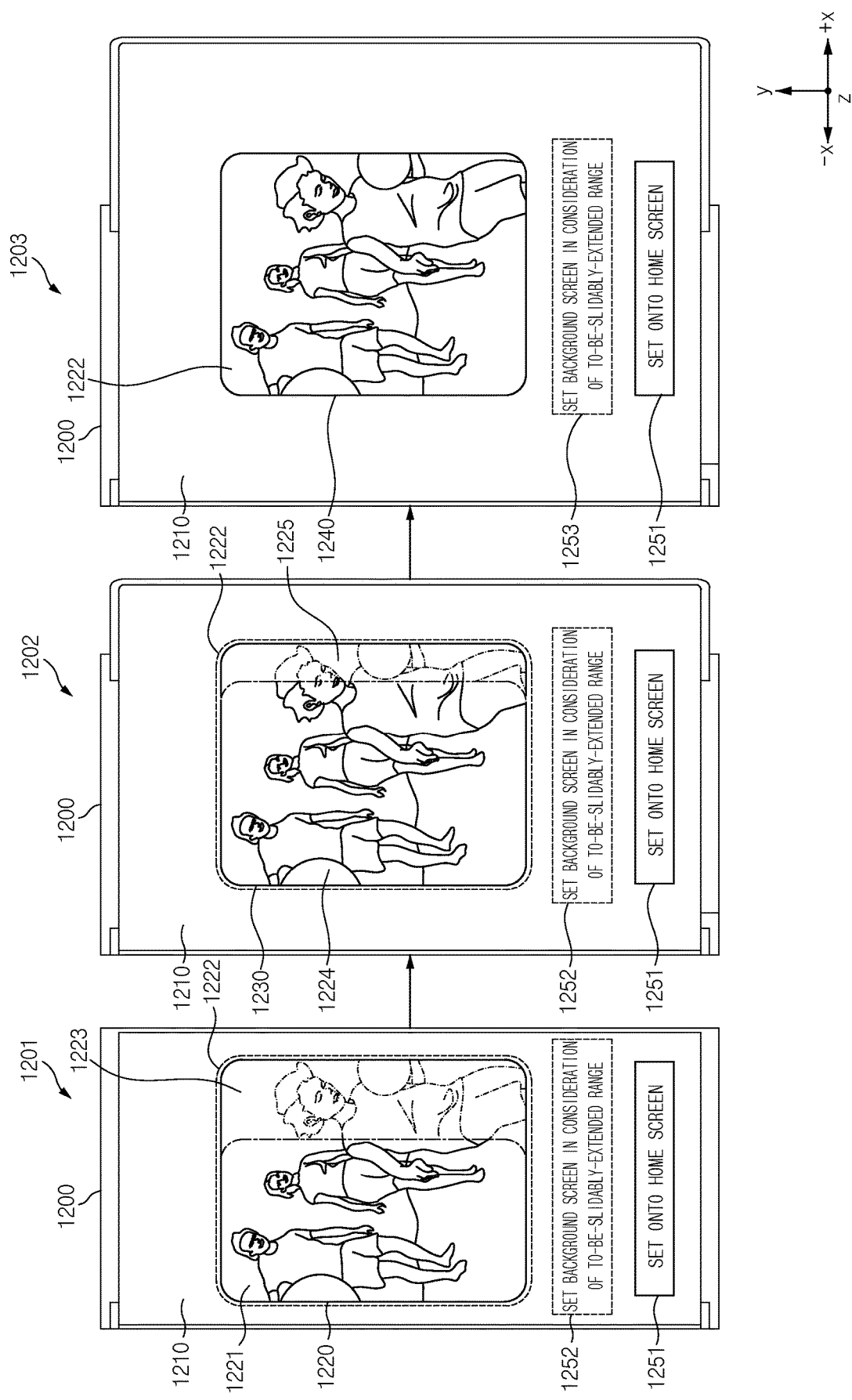
FIG. 12 is a view showing a preview image according to a state of the electronic device according to an embodiment of the disclosure.

FIG. 12 is a view showing a preview image according to a state of the electronic device according to an embodiment of the disclosure.

Referring to FIG. 12, a state of the electronic device 1200 according to an embodiment may include a first state 1201 (e.g., a retracted state) in which the display 1210 has retracted, the second state 1203 in which the display 1210 has extended (e.g., an extended state) and a third state 1202 (e.g., an intermediate state) in which a portion of the display 1210 has retracted or extended. As the state of the electronic device 1200 is gradually changed to the first state 1201, the third state 1202, and the second state 1203, the display area of the display 1210 may be gradually enlarged.

The electronic device 1200 of the first state 1201 may display a preview image 1220 (e.g., the second preview image 830 of FIG. 8) on the display 1210. The preview image 1220 displayed on the display 1210 of the electronic device 1200 in the first state 1201 may include a second area 1222 including a first area 1221 of a selected image and a third area 1223 adjacent to the first area 1221 in an extending direction (e.g., +x direction) of the display 1210. The first area 1221 of the image displayed on the display 1210 of the electronic device 1200 in the first state 1201 may correspond to the background screen displayed in the first state 1201 of the electronic device 1200. The second area 1222 of the image may correspond to a background screen displayed in the second state 1203 of the electronic device 1200. An aspect ratio of the first area 1221 of the image may correspond to an aspect ratio of a display area of the display 1210 visually exposed in the first state 1201 of the electronic device 1200. An aspect ratio of the second area 1222 of the image may correspond to an aspect ratio of the enlarged display area of the display 1210 visually exposed in the second state 1203 of the electronic device 1200.

The electronic device 1200 which is in the first state 1201 may use the display 1210 to set display attribute (e.g., transparency, saturation, brightness of at least a portion of the second area 1222 of the image in the preview image 1220 to be different from that of a remaining portion thereof. The electronic device 1200 which is in the first state 1201 may display the first area 1221 of the image based on first display attribute, and may display the third area 1223 based on second display attribute which is at least partially different from the first display attribute. The electronic device 1200 according to one embodiment may set the transparency of the third area 1223 of the image to be higher than that of the first area 1221. For example, the electronic device 1200 may set the transparency of the first area 1221 of the image to 0% and the transparency of the third area 1223 to 50% and display the same on the display 1210. The electronic device 1200 according to one embodiment may extend and display an area displayed based on the display attribute in the preview image 1220 in proportion to the extension of the display area of the display 1210 as the state of the electronic device 1200 is changed from the first state 1201 to the second state 1203.

The electronic device 1200 of the third state 1202 may display a preview image 1230 on the display 1210. The preview image 1230 displayed on the display 1210 of the electronic device 1200 in the third state 1202 may include a second area 1222 including the sixth area 1224 of the selected image and a seventh area 1225 adjacent to the sixth area 1224 in the extending direction (e.g., +x direction) of the display 1210. In the preview image 1230 displayed on the display 1210 of the electronic device 1200 in the third state 1202, the sixth area 1224 may correspond to the background screen displayed when the third state 1202 is a current state of the electronic device 1200. The sixth area 1224 may include the first area 1221 and one area adjacent to the first area 1221 in the extending direction of the display 1210. The seventh area 1225 may be a remaining area except for the sixth area 1224 in the second area 1222.

The electronic device 1200 of the third state 1202 may display the sixth area 1224 of the image based on first display attribute, and display the seventh area 1225 based on second display attribute which is at least partially different from the first display attribute. The electronic device 1200 according to one embodiment may set the transparency of the seventh area 1225 of the image to be higher than that of the sixth area 1224. For example, the electronic device 1200 may set the transparency of the sixth area 1224 of the image to 0% and the transparency of the seventh area 1225 to 50% and display the same on the display 1210.

As the electronic device 1200 according to an embodiment is gradually changed to the first state 1201, the third state 1202 and the second state 1203, the electronic device 1200 may display the preview image 1230 in a corresponding manner to a varying state of the electronic device 1200. The electronic device 1200 may extend and display an area (e.g., the first area 1221 and the sixth area 1224) of the image displayed based on the first display attribute in proportion to the extension of the display 1210. As the display 1210 extends, the electronic device 1200 may reduce and display an area (e.g., the third area 1223 and the seventh area 1225) of the image displayed based on the second display attribute.

The electronic device 1200 which is in the second state 1203 may display the preview image 1240 (e.g., the third preview image 1020 in FIG. 10) corresponding to the background screen displayed in the second state 1203 on the display 1210.

As the electronic device 1200 according to one embodiment is gradually changed to the first state 1201, the third state 1202 and the second state 1203, the electronic device 1200 may display the preview images 1220, 1230, and 1240 in a corresponding manner to a varying state thereof. Thus the user may intuitively grasp the change of the background screen according to the state of the electronic device 1200.

The electronic device 1200 which is in each of the first state 1201, the third state 1202 and the second state 1203 may display user interfaces (i.e., first icon 1251, first information 1252, and second information 1253) related to the background screen setting on the display 1210. The electronic device 1200 which is in each of the first state 1201 and the third state 1202 may display a first icon 1251 and first information 1252 for setting the background screen on the display 1210. For example, the first information 1252 may include "Set a background screen in consideration of a to-be-slidably-retracted range". The electronic device 1200 which is in the second state 1203 may display the first icon 1251 and second information 1253 for setting the background screen on the display 1210. For example, the second information 1253 may include "Set a background screen in consideration of a to-be-extracted range of a slide". The user interfaces 1251, 1252, and 1253 shown in FIG. 12 are only examples. The disclosure is not limited to the illustrated examples.

Hereinafter, with reference to FIG. 13, an electronic device according to one embodiment will be described.

Figure 13:
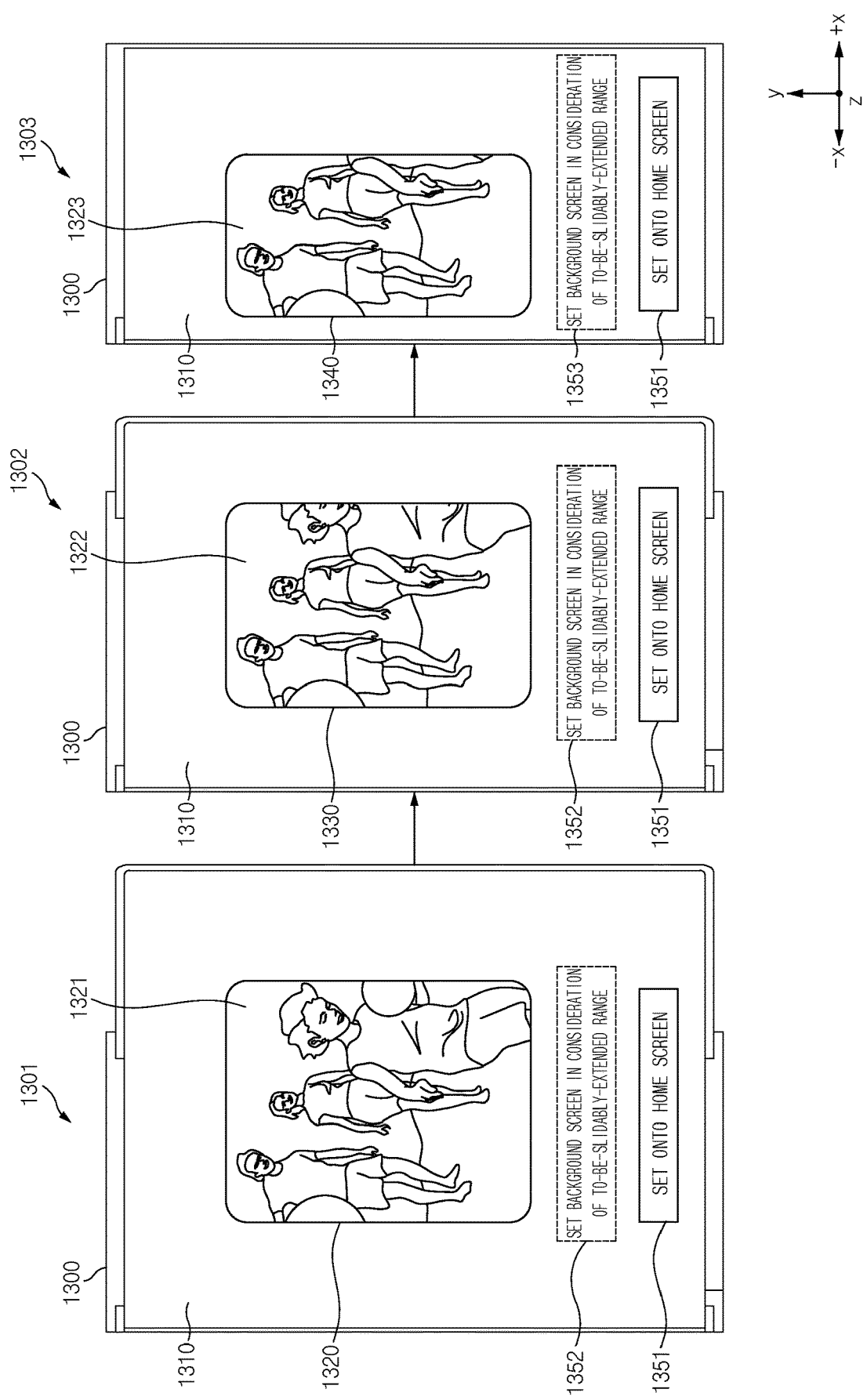
FIG. 13 is a view showing a preview image according to a state of the electronic device according to an embodiment of the disclosure.

FIG. 13 is a view showing a preview image according to a state of the electronic device according to an embodiment of the disclosure.

Referring to FIG. 13, a state of the electronic device 1300 according to an embodiment may include a second state 1301 (e.g., an extended state) in which a display 1310 has extended, a first state 1303 (e.g., a retracted state) in which the display 1310 has retracted and a third state 1302 (e.g., an intermediate state) in which a portion of the display 1310 has retracted or extended. As the state of the electronic device 1300 is gradually changed to the second state 1301, the third state 1302, and the first state 1303, the display area of the display 1310 may be gradually reduced. The electronic device 1300 according to one embodiment may reduce and display preview images 1320, 1330 and 1340 in proportional to the reduction of the display area of the display 1310 as the state of the device is changed from the second state 1301 to the first state 1303.

The electronic device 1300 which is in the second state 1301 may display a preview image 1320 corresponding to the second state 1301 on the display 1310. The preview image 1320 displayed on the display 1310 of the electronic device 1300 in the second state 1301 may correspond to the preview image of the background screen displayed in the second state 1301 of the electronic device 1300. The preview image 1330 displayed on the display 1310 of the electronic device 1300 in the second state 1301 may include an eighth area 1321 of a selected image.

The electronic device 1300 which is in the third state 1302 may display the preview image 1330 on the display 1310.

The preview image 1330 displayed on the display 1310 of the electronic device 1300 in the third state 1302 may correspond to the background screen displayed in the third state 1302 of the electronic device 1300. The preview image 1330 may be free of one area which is present in the eighth area 1321 in the preview image 1320. For example, the preview image 1330 displayed on the display 1310 of the electronic device 1300 in the third state 1302 may include a ninth area 1322 corresponding to one area within the eighth area 1321 of the image. As the electronic device 1300 according to one embodiment is gradually changed to the second state 1301, the third state 1302 and the first state 1303, the electronic device 1300 may display the preview images 1320, 1330, and 1340 based on the varying state thereof. The electronic device 1300 may reduce and display the preview image 1330 in proportion to the retraction of the display 1310.

The electronic device 1300 which is in the first state 1303 may display the preview image 1340 corresponding to the first state 1303 on the display 1310. The preview image 1340 displayed on the display 1310 of the electronic device 1300 in the first state 1303 may correspond to the preview image of the background screen displayed in the first state 1303 of the electronic device 1300. The preview image 1340 may be free of one area which is present in the ninth area 1322 in the preview image 1330. For example, the preview image 1340 displayed on the display 1310 of the electronic device 1300 in the first state 1303 may include a tenth area 1323 corresponding to one area within the ninth area 1322 of the image.

As the electronic device 1300 according to one embodiment is gradually changed to the second state 1301, the third state 1302 and the first state 1303, the electronic device 1300 may display the preview images 1320, 1330, and 1340 based on the varying state thereof. Thus, the user may intuitively grasp the change of the background screen according to the state of the electronic device 1300.

The electronic device 1300 which is in each of the first state 1303, the third state 1302 and the second state 1301 may display user interface (i.e., first icon 1351, first information 1352, and second information 1353) related to the background screen setting on the display 1310. The electronic device 1300 which is in each of the second state 1301 and the third state 1302 may display a first icon 1351 and first information 1352 for setting the background screen on the display 1310. For example, the first information 1352 may include "Set a background screen in consideration of a to-be-slidably-retracted range". The electronic device 1300 which is in the first state 1303 may display the first icon 1351 and second information 1353 for setting the background screen on the display 1310. For example, the second information 1353 may include "Set a background screen in consideration of a to-be-slidably-extended range". The user interfaces 1351, 1352, and 1353 shown in FIG. 13 are only examples. The disclosure is not limited to the illustrated examples.

Figure 14:
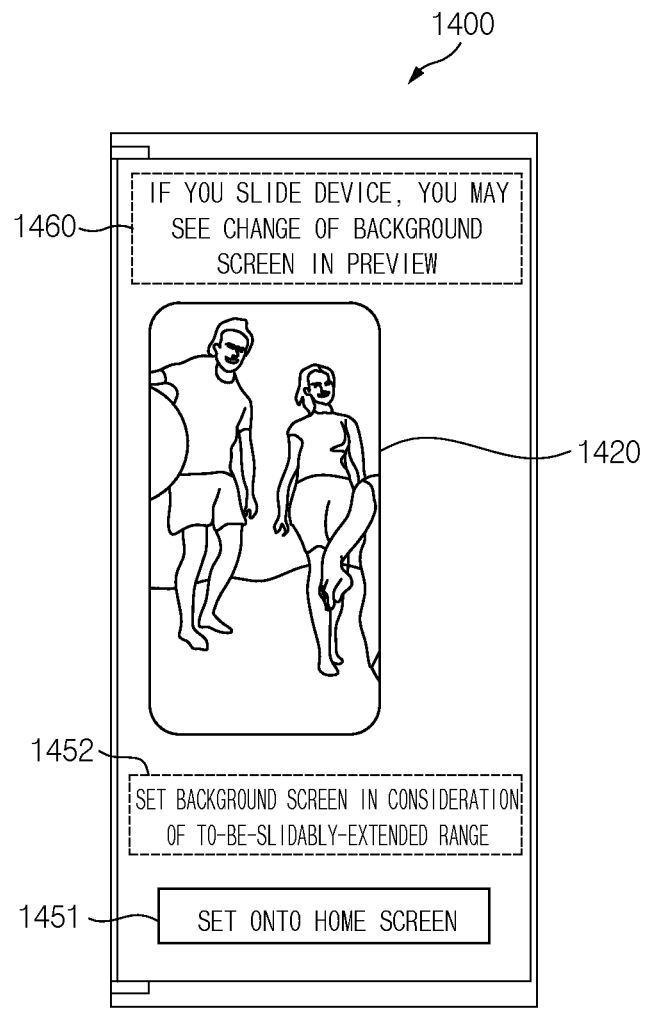
FIG. 14 is a diagram showing a background screen setting screen in an electronic device according to an embodiment of the disclosure.

FIG. 14 is a diagram showing a background screen setting screen in an electronic device according to an embodiment of the disclosure.

Referring to FIG. 14, an electronic device 1400 according to one embodiment may display a preview image 1420 (e.g., the preview image (820, 830) in FIG. 8) and a user interface (i.e., first icon 1451, first information 1452, second information 1460) for setting the background screen. The user interface (i.e., first icon 1451, first information 1452, and second information 1460) may include a first icon 1451, first information 1452, and second information 1460. For example, the first information 1452 may include "Set a background screen in consideration of a slidably-extended range". The second information 1460 may include a guide phrase that guide the user to actually slide the electronic device on the background screen setting screen. For example, the second information 1460 may include a guide phrase including content that a preview image displaying a background screen that changes according to a change in the state of the electronic device is displayed. For example, the second information 1460 may include "if you slide the device, you may see change of a background screen in a preview".

Hereinafter, with reference to FIG. 15, an operation configuration of an electronic device according to one embodiment it will be described.

Figure 15:
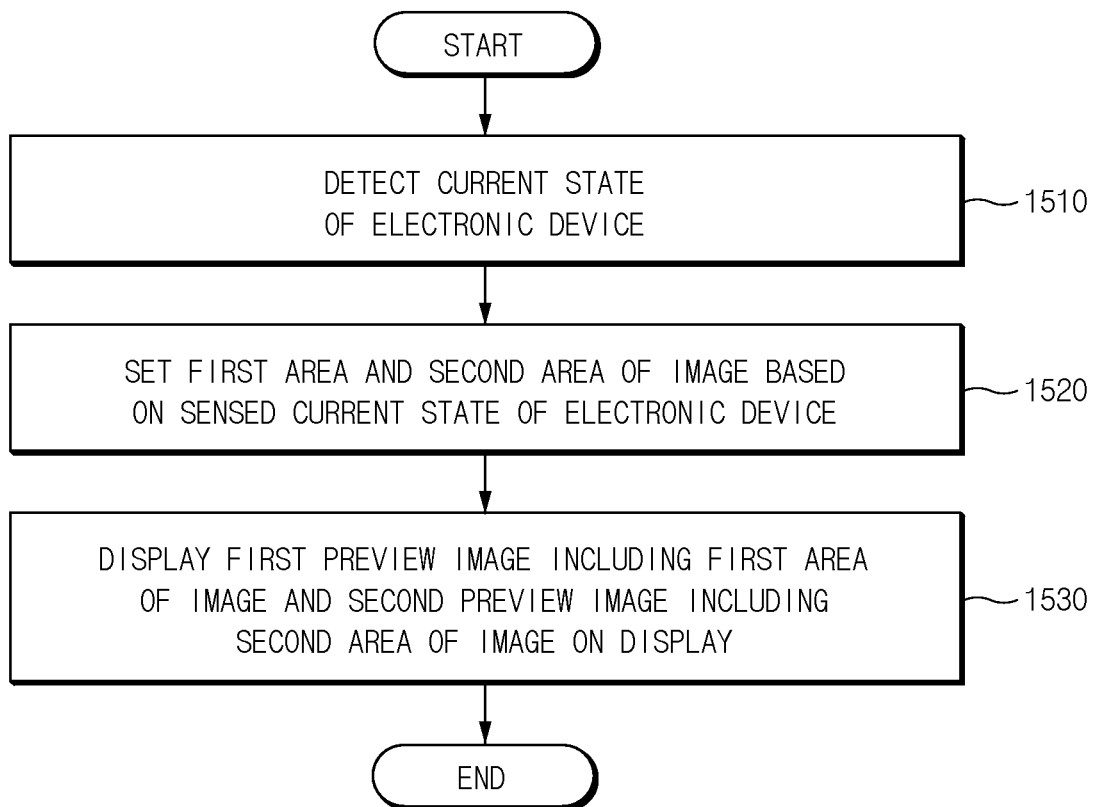
FIG. 15 is a flowchart showing an operation configuration of an electronic device according to an embodiment of the disclosure.

FIG. 15 is a flowchart showing an operation configuration of an electronic device according to an embodiment of the disclosure. Hereinafter, an operation of the electronic device may be referred to as an operation of a processor (e.g., the processor 120 in FIG. 1).

Referring to FIG. 15, in operation 1510, the electronic device according to one embodiment may detect a current state of the electronic device. For example, the electronic device may detect a current state of the electronic device using a sensor (e.g., the sensor module 176 of FIG. 1). According to an embodiment, the electronic device may acquire state information about the current state of the electronic device. The electronic device according to one embodiment may identify the extended or retracted state of the display.

In operation 1520, the electronic device according to one embodiment may set a first area and a second area of a specified image based on the sensed current state (or acquired state information) of the electronic device. The specified image may be an image selected by a user input for selecting an image. When the current state of the electronic device detected in operation 1510 corresponds to the first state (e.g., the retracted state), in operation 1520, the electronic device may set one area of the specified image displayed as a background screen in the first state as the first area, and one area of the specified image displayed as a background screen in the second state (e.g., the extended state) as the second area. For example, the first area of the image may be set based on a user input. The electronic device may set the second area including the first area and at least one area adjacent to the first area based on the set first area. When the current state of the electronic device detected in operation 1510 corresponds to the second state (e.g., the extended state), in operation 1520, the electronic device may set one area of the specified image displayed as the background screen in the second state as the second area and one area of the specified image displayed as a background screen in the first state (e.g., the retracted state) as the first area. For example, the second area of the image may be set based on a user input. The electronic device may set the first area located in the second area based on the second area.

In operation 1530, the electronic device according to one embodiment may display the first preview image including the first area of the image and the second preview image including the second area of the image on the display. The first preview image may correspond to the background screen displayed in the first state, and the second preview image may correspond to the background screen displayed in the second state. The electronic device according to one embodiment may sequentially display the first preview image and the second preview image. For example, the electronic device may display the first preview image for a specified time duration and then display the second preview image on the display. In another example, the electronic device may display the second preview image for a specified time duration and then display the first preview image on the display. In still another example, the electronic device may alternately display the first preview image and the second preview image on the display.

Hereinafter, with reference to FIG. 16, an operation configuration of the electronic device according to one embodiment will be described.

Figure 16:
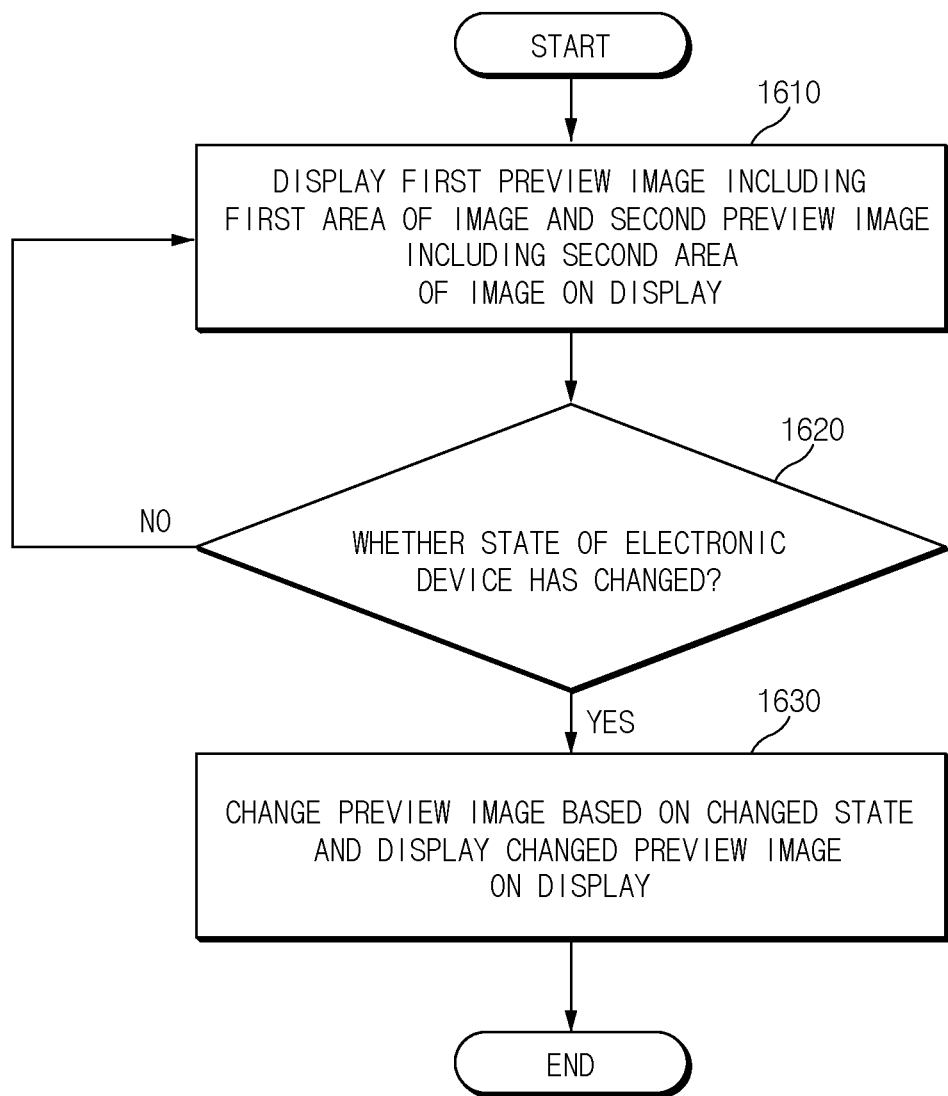
FIG. 16 is a flowchart showing an operation configuration of an electronic device according to an embodiment of the disclosure.

FIG. 16 is a flowchart showing an operation configuration of an electronic device according to an embodiment of the disclosure. Hereinafter, an operation of the electronic device may be referred to as an operation of the processor (e.g., the processor 120 in FIG. 1).

Referring to FIG. 16, in operation 1610, the electronic device according to one embodiment may display a first preview image including a first area of an image and a second preview image including a second area of the image on the display. The first preview image may correspond to a background screen displayed in the first state (e.g., the retracted state), and the second preview image may correspond to a background screen displayed in the second state (e.g., the extended state). For example, the electronic device may display the first preview image for a specified timed duration and then display the second preview image on the display. In another example, the electronic device may display the second preview image for a specified time duration and then display the first preview image on the display. In still another example, the electronic device may alternately display the first preview image and the second preview image on the display.

In operation 1620, the electronic device according to one embodiment may detect (or identify) whether the state of the electronic device has changed. When the change in the state of the electronic device is not detected (NO), the electronic device may perform operation 1610.

When the state change of the electronic device is detected (YES), in operation 1630, the electronic device may change the preview image based on the changed state and display the changed preview image on the display. For example, when the extended state of the electronic device is detected, the electronic device according to one embodiment may extend and display the first area in the preview image of the first state and/or the third state in proportion to the extension of the display area of the display. In another example, when the retracted state of the electronic device is detected, the electronic device according to one embodiment may reduce and display the preview image in the second state in proportion to the reduction of the display area of the display.

Hereinafter, with reference to FIG. 17, a method in which an electronic device (e.g., the electronic device 101 of FIG. 1) according to one embodiment executes a background screen setting application will be described.

Figure 17:
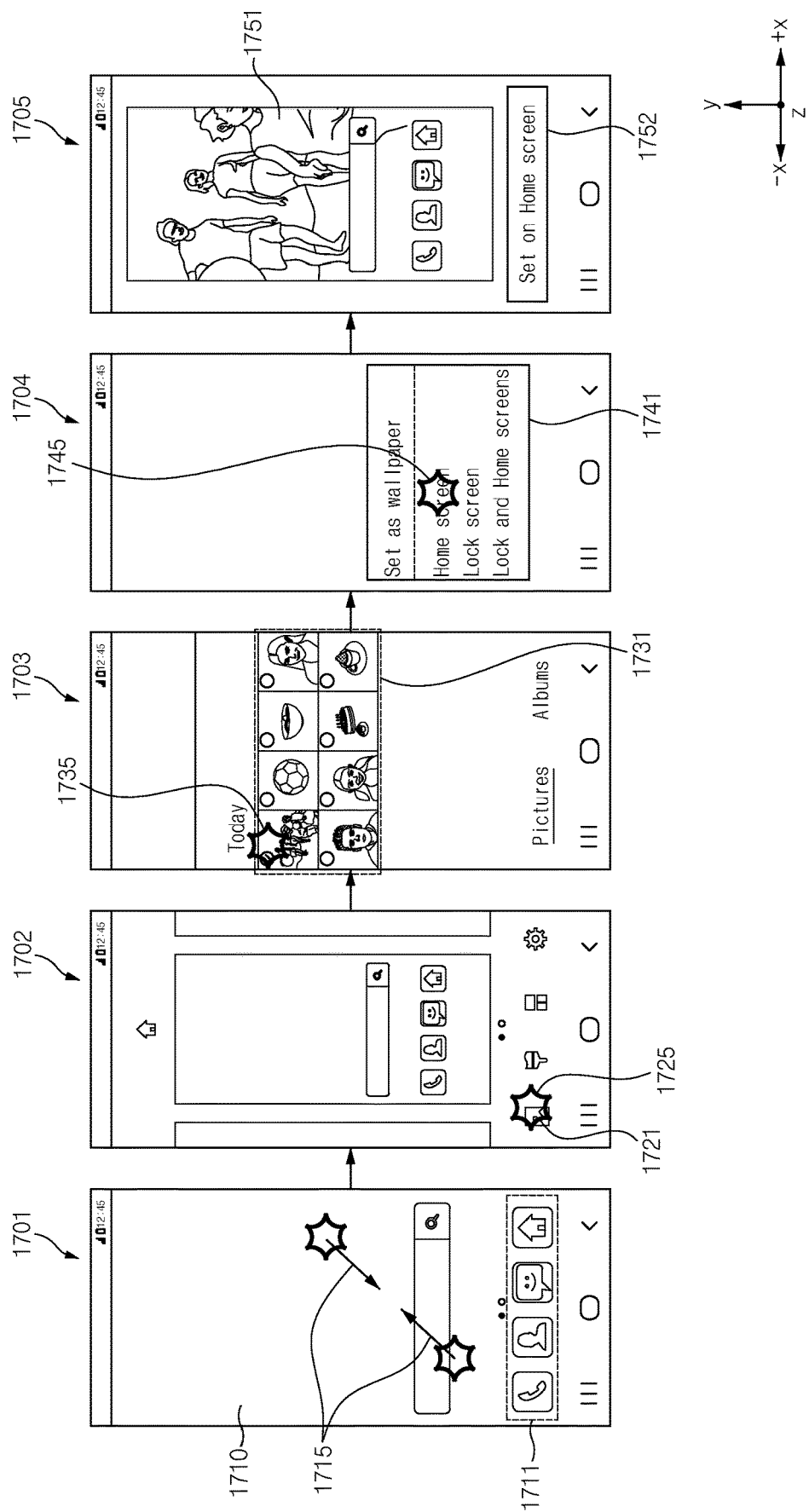
FIG. 17 is a diagram showing that an electronic device executes a background screen setting application according to an embodiment of the disclosure.

FIG. 17 is a diagram showing that the electronic device executes the background screen setting application according to an embodiment of the disclosure.

Referring to FIG. 17, the electronic device according to one embodiment may display a preset background screen 1710 and at least one icon 1711 for execution of an application (e.g., the application 146 of FIG. 3) on a first screen 1701 (e.g., a home screen).

Upon receiving a specified first user input 1715 (e.g., two drag inputs in opposite directions) to the first screen 1701, the electronic device according to one embodiment may display a first user interface 1721 (e.g., a background screen setting icon) for execution of a background screen setting application on a second screen 1702.

Upon receiving a second user input 1725 to the first user interface 1721, the electronic device according to one embodiment may display at least one image 1731 on a third screen 1703. For example, the electronic device may display at least one image 1731 stored in a memory (e.g., the memory 130 of FIG. 1) by an album (e.g., the album (375) in FIG. 3) application.

Upon receiving a third user input 1735 to one of the at least one image 1731, the electronic device according to one embodiment may display, on the fourth screen 1704, a second user interface 1741 including a list of screens for which background screens are to be set. For example, the second user interface 1741 may include "Home screen", "Lock screen", and "Lock and Home screens".

Upon receiving a fourth user input 1745 to the second user interface 1741 (e.g., Home screen), a background screen setting application may be executed. In response to the execution of the background screen setting application, the electronic device according to one embodiment may display, on a fifth screen 1705 (e.g., a background screen setting screen), a preview image (1751) for the background screen to be set based on a selected image, and an icon (1752) for background screen setting (e.g., the first icon 851 of FIG. 8, the first icon 1051 of FIG. 10, the first icon 1251 of FIG. 12, the first icon 1351 of FIG. 13, or the first icon 1451 of FIG. 14).

Hereinafter, with reference to FIG. 18, a method in which an electronic device (e.g., the electronic device 101 of FIG. 1) according to one embodiment executes a background screen setting application is described.

Figure 18:
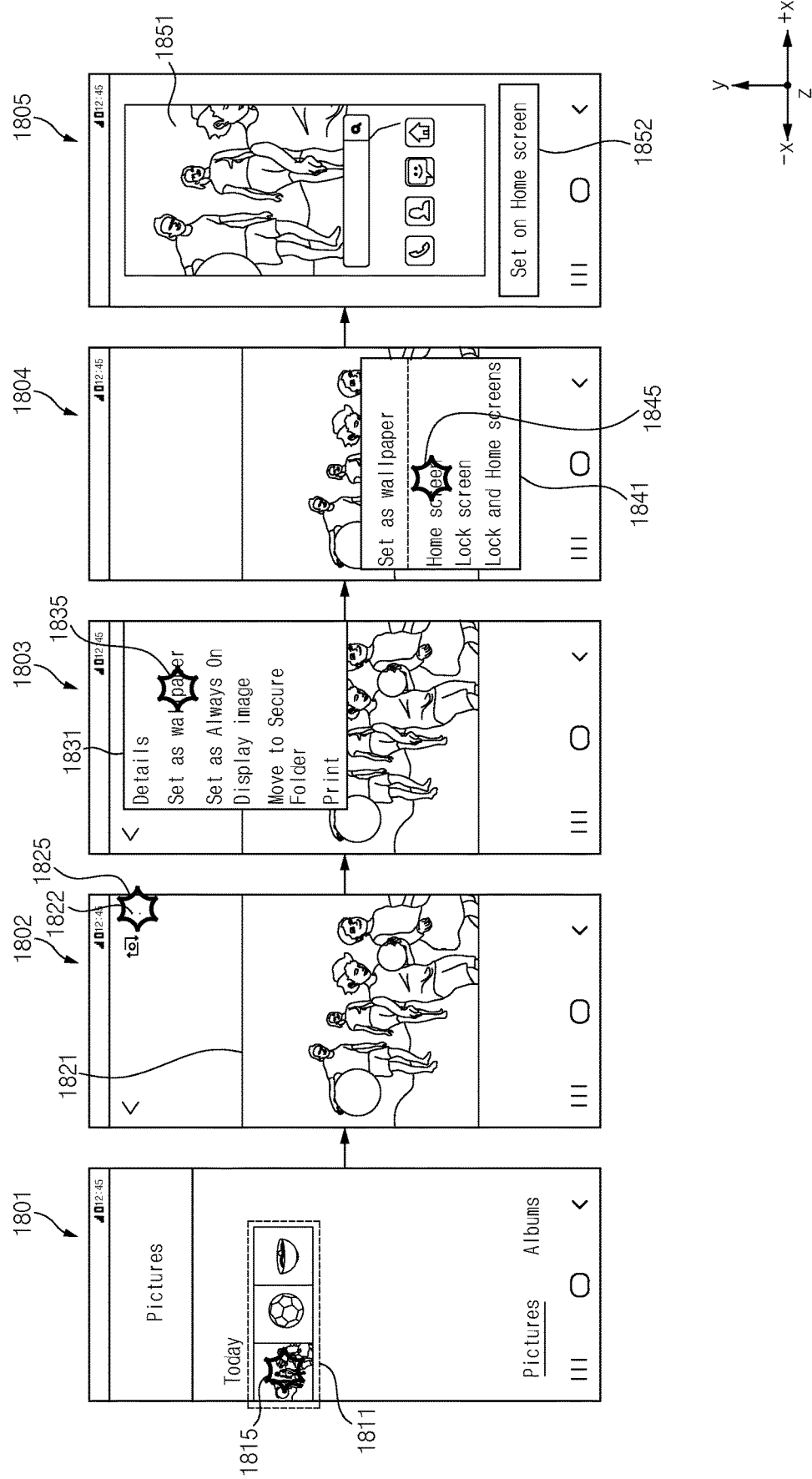
FIG. 18 is a diagram showing that an electronic device executes a background screen setting application according to an embodiment of the disclosure.

FIG. 18 is a diagram showing that the electronic device executes the background screen setting application according to an embodiment of the disclosure.

Referring to FIG. 18, is in response to execution of an album (e.g., the album (375) in FIG. 3) application, the electronic device according to one embodiment may display at least one image 1811 on a first screen 1801.

Upon receiving a first user input 1815 to one of the at least one image 1811, the electronic device according to one embodiment may display a selected image 1821 and a first icon 1822 on a second screen 1802.

Upon receiving a second user input 1825 to the first icon 1822, the electronic device according to one embodiment may display a first user interface 1831 including at least one execution list that may be performed on the selected image 1821 on a third screen 1803. For example, the first user interface 1831 may include "Details", "Set as wallpaper", "Set as Always On Display Image", "Move to Secure Folder", and "Print".

Upon receiving a third user input 1835 to the first user interface 1831 (e.g., Set as wall paper), the electronic device according to one embodiment may display, on a fourth screen 1804, a second user interface 1841 including a list of screens for which background screens is to be set. For example, the second user interface 1841 may include "Home screen", "Lock screen", and "Lock and Home screens".

Upon receiving a fourth user input 1845 to the second user interface 1841 (e.g., Home screen), a background screen setting application may be executed. In response to execution of the background screen setting application, the electronic device according to one embodiment may display, on a fifth screen 1805 (e.g., a background screen setting screen), a preview image 1851 (e.g., the preview images 820 and 830 in FIG. 8) for the background screen to be set based on a selected image, and an icon 1852 for background screen setting (e.g., the first icon 851 in FIG. 8), the first icon 1051 in FIG. 10, the first icon 1251 in FIG. 12, the first icon 1351 in FIG. 13, or the first icon 1451 in FIG. 14).

An electronic device (e.g., the electronic device 101 of FIG. 1, the electronic device 400 of FIG. 4, the electronic device 600 of FIG. 6, the electronic device 700 of FIG. 7, the electronic device 800 of FIG. 8, the electronic device 1000 in FIG. 10, the electronic device 1200 in FIG. 12, the electronic device 1300 in FIG. 13 or the electronic device (1400) in FIG. 14), according to an embodiment may include a display (e.g., the display 210 in FIG. 2, the display 450 in FIG. 4, the display 650 in FIG. 6, the display 710 in FIG. 7, the display 810 in FIG. 8, the display 1010 in FIG. 10, the display in FIG. 12 1210, or the display 1310 in FIG. 13) having a display area, wherein a size of the display area visually exposed in a first state of the electronic device is reduced and a size of the display area visually exposed in a second state of the electronic device is enlarged; and a processor (e.g., the processor 120 in FIG. 1 or the processor 720 in FIG. 7) operatively connected to the display, wherein the processor may be configured to acquire state information of the electronic device, successively display one and the other of first and second preview images on the display, based on the state information of the electronic device, wherein the first preview image (e.g., the first preview image 820 of FIG. 8, the fourth preview image 1030 of FIG. 10, or the preview image 1340 of FIG. 13) includes a first area (e.g., the first area 861 of FIG. 8, the first area 911 of FIG. 9, the fifth area 1062 of FIG. 10, the fifth area 1112 of FIG. 11, the first area 1221 of FIG. 12, or the tenth area 1323 of FIG. 13) of a specified image and corresponds to a preview image of a background screen in the first state, wherein the second preview image (e.g., the second preview image 830 of FIG. 8, the third preview image 1020 of FIG. 10, or the preview images 1220, 1230, and 1240 or the preview image 1320 of FIG. 13) includes a second area (e.g., the second area 862 of FIG. 8, the second area 912 of FIG. 9, the fourth area 1061 of FIG. 10)), the fourth area 1111 of FIG. 11, the second area 1222 of FIG. 12, or the eighth area 1321 of FIG. 13) including the first area and a further area extending from the first area, and corresponds to a preview image of a background screen in the second state, and specify the image as a background screen, based on a first user input.

According to one embodiment, the further area may include a third area (e.g., the third area 863 in FIG. 8, the third area 913 in FIG. 9, the sixth area 1113 of FIG. 11, or the third area 1223 of FIG. 12) adjacent to the first area.

According to one embodiment, the processor may be configured to display the first preview image on the display having the first state when a state of the electronic device is the first state, and display the second preview image such that the third area gradually appears in one direction.

According to one embodiment, the processor may be configured to display the second preview image on the display having the second state when a state of the electronic device is the second state, and display the first preview image such that the third area gradually disappears in one direction.

According to one embodiment, when a state of the electronic device is the first state, the processor may be configured to display the first area of the image in the second preview image based on first display attribute, and display the third area of the image in the second preview image based on second display attribute at least partially different from the first display attribute.

According to one embodiment, the processor may be configured to extend and display an area of the image displayed based on the first display attribute, in proportion to extension of the display area of the display as the state of the electronic device has changed from the first state to the second state.

According to one embodiment, when a state of the electronic device is the first state, the processor may be configured to specify one area of the image as the first area, based on a second user input, and specify the second area in the image, based on the specified first area and an extending direction of the display.

According to one embodiment, when a state of the electronic device is the second state, the processor may be configured to display the first preview image based on first display attribute, and display the second preview image based on second display attribute at least partially different from the first display attribute.

According to one embodiment, the processor may be configured to reduce and display the second preview image, in proportion to reduction of the display area of the display as the state of the electronic device has changed from the second state to the first state.

According to one embodiment, when a state of the electronic device is the second state, the processor may be configured to specify one area of the image as the second area, based on a second user input, and specify the first area in the image, based on the specified second area and a retracting direction of the display.

According to one embodiment, an aspect ratio of the first area of the image corresponds to an aspect ratio of the display area of the display visually exposed in the first state, wherein an aspect ratio of the second area of the image corresponds to an aspect ratio of the display area of the display visually exposed in the second state.

According to one embodiment, the processor may be configured to, when the electronic device is in the first state, display the first preview image and, subsequently, display the second preview image, or when the electronic device is in the second state, display the second preview image and, subsequently, display the first preview image.

According to one embodiment, the processor may be configured to display, on the display, a user interface (e.g., the second information 1460 of FIG. 14) including a guide phrase including an indication that a preview image representing a background screen varying according to change in the state of the electronic device is displayed.

According to one embodiment, the processor may be configured to display a user interface (e.g., the first icon 851 in FIG. 8, the first icon 1051 in FIG. 10, the first icon 1251 in FIG. 12, the first icon 1351 in FIG. 13, or the first icon 1451 in FIG. 14) related to background screen setting on the display, and specify the image as a background screen, based on the first user input to the user interface.

A method for controlling an electronic device (e.g., the electronic device 101 of FIG. 1, the electronic device 400 of FIG. 4, the electronic device 600 of FIG. 6, the electronic device 700 of FIG. 7, the electronic device 800 of FIG. 8, the electronic device 1000 in FIG. 10, the electronic device 1200 in FIG. 12, the electronic device 1300 in FIG. 13 or the electronic device (1400) in FIG. 14) including a flexible display (e.g., the display 210 in FIG. 2, the display 450 in FIG. 4, the display 650 in FIG. 6, the display 710 in FIG. 7, the display 810 in FIG. 8, the display 1010 in FIG. 10, the display in FIG. 12 1210, or the display 1310 in FIG. 13) having a display area may be disclosed, wherein a size of the display area visually exposed in a first state of the electronic device is reduced and a size of the display area visually exposed in a second state of the electronic device is enlarged. The method may include acquiring state information of the electronic device, successively displaying one and the other of first and second preview images on the display, based on the state information of the electronic device, wherein the first preview image (e.g., the first preview image 820 of FIG. 8, the fourth preview image 1030 of FIG. 10, or the preview image 1340 of FIG. 13) includes a first area (e.g., the first area 861 of FIG. 8, the first area 911 of FIG. 9, the fifth area 1062 of FIG. 10, the fifth area 1112 of FIG. 11, the first area 1221 of FIG. 12, or the tenth area 1323 of FIG. 13) of a specified image and corresponds to a preview image of a background screen in the first state, wherein the second preview image (e.g., the second preview image 830 of FIG. 8, the third preview image 1020 of FIG. 10, or the preview images 1220, 1230, and 1240 or the preview image 1320 of FIG. 13) includes a second area (e.g., the second area 862 of FIG. 8, the second area 912 of FIG. 9, the fourth area 1061 of FIG. 10)), the fourth area 1111 of FIG. 11, the second area 1222 of FIG. 12, or the eighth area 1321 of FIG. 13) including the first area and a further area extending from the first area, and corresponds to a preview image of a background screen in the second state, and specifying the image as a background screen, based on a first user input.

According to one embodiment, the further area may include a third area (e.g., the third area 863 in FIG. 8, the third area 913 in FIG. 9, the sixth area 1113 of FIG. 11, or the third area 1223 of FIG. 12) adjacent to the first area.

According to one embodiment, the method may include displaying the first preview image on the display having the first state when a state of the electronic device is the first state, and displaying the second preview image such that the third area gradually appears in one direction.

According to one embodiment, the method may include displaying the second preview image on the display having the second state when a state of the electronic device is the second state, and displaying the first preview image such that the third area gradually disappears in one direction.

According to one embodiment, when a state of the electronic device is the first state, the device may display the first area of the image in the second preview image based on first display attribute, and display the third area of the image in the second preview image based on second display attribute at least partially different from the first display attribute.

According to one embodiment, the method may include extending and displaying an area of the image displayed based on the first display attribute, in proportion to extension of the display area of the display as the state of the electronic device has changed from the first state to the second state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device comprising:
a housing including slidable structures;
a display disposed at the housing;
at least one processor operatively connected to the display; and
a memory storing instructions that, when executed by the at least one processor, cause the electronic device to:
 display at least one preview image including a first area indicating a background screen to be displayed corresponding to current state of the electronic device, wherein the state of the electronic device is changed between a first state where the electronic device is retracted and a second state where the electronic device is extended,
 based on changing the state of the electronic device from the first state to the second state, extend the first area gradually,
 specify the at least one preview image as an image for the background screen, and
 display a portion of the at least on preview image indicated by the first area as the background screen based on the state of the electronic device.
2. The electronic device of claim 1, wherein the memory storing the instructions that, when executed by the at least one processor, further cause the electronic device to:
 as the state of the electronic device is being extended, extend a portion indicated by the first area in the at least one preview image and reduce another portion at least one preview image.
3. The electronic device of claim 2, wherein the memory storing the instructions that, when executed by the at least one processor, further cause the electronic device to:
 based on changing the state of the electronic device from the second state to the first state, reduce the portion indicated by the first area in the at least one preview image.
4. The electronic device of claim 3, wherein the memory storing the instructions that, when executed by the at least one processor, further cause the electronic device to:
 when the electronic device is in the first state, display a first preview image and, subsequently, display a second preview image, and
 when the electronic device is in the second state, display the second preview image and, subsequently, display the first preview image,
 wherein the first preview image corresponds to a background screen to be displayed in the first state, and
 wherein the second preview image corresponds to a background screen to be displayed in the second state.
5. The electronic device of claim 1,
wherein the display attributes include at least one of transparency, saturation, or brightness, and
wherein the memory storing the instructions that, when executed by the at least one processor, further cause the electronic device to:
 display the first area based on a first display attribute, and
 display a second area excluding the first area in the at least one preview image based on a second display attribute at least partially different from the first display attribute.
6. The electronic device of claim 1, wherein the memory storing the instructions that, when executed by the at least one processor, further cause the electronic device to extend a portion indicated by the first area in the at least one preview image, in proportion to extension of a display area of the display as the state of the electronic device is being changed from the first state to the second state.
7. The electronic device of claim 1, wherein the memory storing the instructions that, when executed by the at least one processor, further cause the electronic device to:
 in the first state, specify one area of the at least one preview image as the first area, based on a second user input.
8. The electronic device of claim 1, wherein the memory storing the instructions that, when executed by the at least one processor, further cause the electronic device to:
 reduce a portion indicated by the first area in the at least one preview image, in proportion to reduction of a display area of the display as the state of the electronic device is being changed from the second state to the first state.
9. The electronic device of claim 1, wherein the memory storing the instructions that, when executed by the at least one processor, further cause the electronic device to:
 in the second state, specify one area of the at least one preview image as a third area comprising the first area and a second area adjacent to the first area, based on a second user input, and
 specify the first area in the at least one preview image, based on the third area and a retracting direction of the display.
10. The electronic device of claim 1, wherein the memory storing the instructions that, when executed by the at least one processor, further cause the electronic device to:
 detect the state of the electronic device, and
 wherein an aspect ratio of the first area corresponds to an aspect ratio of a display area that is visually exposed in the detected state, and
 wherein an aspect ratio of a second area excluding the first area in the at least one preview image corresponds to an aspect ratio of the display area that is not visually exposed in the detected state.
11. The electronic device of claim 1, wherein the memory storing the instructions that, when executed by the at least one processor, further cause the electronic device to display, on the display, a user interface comprising a guide phrase including an indication that at least one preview image representing a background screen varying according to a change in the state of the electronic device is displayed.

12. The electronic device of claim 1, wherein the memory storing the instructions that, when executed by the at least one processor, further cause the electronic device to:
   display a user interface related to background screen setting on the display, and
   specify a specified image for the background screen, based on a first user input to the user interface.

13. A method for controlling an electronic device including a flexible display disposed at a housing including slidable structures, the method comprising:
   displaying at least one preview image including a first area indicating a background screen to be displayed corresponding to current state of the electronic device, wherein the state of the electronic device is changed between a first state where the electronic device is retracted and a second state where the electronic device is extended;
   based on changing the state of the electronic device from the first state to the second state, extend the first area gradually;
   specifying the at least one preview image as an image for the background screen; and
   displaying a portion of the at least on preview image indicated by the first area as the background screen based on the state of the electronic device.

14. The method of claim 13, further comprising:
as the state of the electronic device is being extended, extending a portion indicated by the first area in the at least one preview image and reduce another portion in the at least one preview image.

15. The method of claim 14, further comprising:
based on changing the state of the electronic device from the second state to the first state, reduce the portion indicated by the first area in the at least one preview image.

16. The method of claim 13,
wherein the display attributes include at least one of transparency, saturation, or brightness, and
wherein the method further comprises:
   displaying the first area based on a first display attribute; and
   displaying a second area excluding the first area in the at least one preview image based on second display attribute at least partially different from the first display attribute.

17. The method of claim 13, further comprising:
extending a portion indicated by the first area in the at least one preview image, in proportion to extension of a display area of the flexible display as the state of the electronic device is being changed from the first state to the second state.

18. The method of claim 13, further comprising:
reducing a portion indicated by the first area in the at least one preview image, in proportion to reduction of a display area of the flexible display as the state of the electronic device is being changed from the second state to the first state.

* * * * *